United States Patent
Lee et al.

(10) Patent No.: US 10,382,904 B2
(45) Date of Patent: Aug. 13, 2019

(54) METHOD AND APPARATUS FOR PROVIDING SERVICE IN A WIRELESS COMMUNICATION SYSTEM

(71) Applicant: Samsung Electronics Co., Ltd., Suwon-si, Gyeonggi-do (KR)

(72) Inventors: Hoyeon Lee, Hwaseong-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/197,111

(22) Filed: Jun. 29, 2016

(65) Prior Publication Data
US 2016/0381528 A1 Dec. 29, 2016

(30) Foreign Application Priority Data

Jun. 29, 2015 (KR) .......................... 10-2015-0092558
Jul. 23, 2015 (KR) .......................... 10-2015-0104587

(51) Int. Cl.
H04W 4/10 (2009.01)
H04W 4/90 (2018.01)
H04W 76/45 (2018.01)

(52) U.S. Cl.
CPC .............. *H04W 4/10* (2013.01); *H04W 4/90* (2018.02); *H04W 76/45* (2018.02)

(58) Field of Classification Search
CPC ....... H04W 4/10; H04W 76/005; H04W 4/22; H04W 76/45; H04L 65/4015; H04M 1/72577; H04M 3/42187
See application file for complete search history.

(56) References Cited

U.S. PATENT DOCUMENTS 8,878,889 B1    11/2014 Kaupp et al.
2004/0165553 A1*   8/2004 Park ...................... H04W 88/02
                                                             370/329

(Continued)

FOREIGN PATENT DOCUMENTS

WO       2014-039312 A1    3/2014

OTHER PUBLICATIONS

3GPP Specification detail, Study on application architecture to support Mission Critical Push to Talk over LTE (MCPTT) services (Release 13), 3GPP TR 23.779, V1.0.0, Jun. 21, 2015.

(Continued)

*Primary Examiner* — Quoc Thai N Vu
(74) *Attorney, Agent, or Firm* — Jefferson IP Law, LLP

(57) ABSTRACT

A method and an apparatus for providing a service in a wireless communication system are disclosed. The method and apparatus are directed to converging a $5^{th}$-generation (5G) communication system for supporting higher data rates beyond a $4^{th}$-generation (4G) system with a technology for Internet of things (IoT). The apparatus includes a terminal in the wireless communication system. The terminal includes a transceiver configured to transmit and receive a signal, and a processor configured to receive a first service request related to mission critical push to talk over LTE (MCPTT) over long term evolution (LTE), determine whether a first service corresponding to the first service request and a second service request being currently performed are simultaneously provided, and process the first service and the second service based on a priority of each of the service, services if the first service and the second service are not simultaneously provided.

6 Claims, 16 Drawing Sheets

(56) References Cited

U.S. PATENT DOCUMENTS

| | | |
|---|---|---|
| 2007/0197248 A1 | 8/2007 | Reich et al. |
| 2007/0282685 A1 | 12/2007 | Huh et al. |
| 2010/0035603 A1* | 2/2010 | Saijonmaa .......... G06F 9/44505 |
| | | 455/426.1 |
| 2010/0137015 A1 | 6/2010 | Blanco |
| 2012/0208588 A1 | 8/2012 | Blanco |
| 2014/0068624 A1 | 3/2014 | Fuller et al. |
| 2015/0141030 A1 | 5/2015 | Basu-Mallick et al. |

OTHER PUBLICATIONS

Mostafa Zaman Chowdhury et al., Call admission control based on adaptive bandwidth allocation for wireless networks, Journal of Communications and Networks (vol. 15, Issue: 1), IEEE, pp. 15-24, Mar. 11, 2013.
European Office Action dated May 27, 2019, issued in European Application No. 16818208.7.

* cited by examiner

METHOD AND APPARATUS FOR PROVIDING SERVICE IN A WIRELESS COMMUNICATION SYSTEM

CROSS-REFERENCE TO RELATED APPLICATION(S)

This application claims the benefit under 35 U.S.C. § 119(a) of a Korean patent application filed on Jun. 29, 2015 in the Korean Intellectual Property Office and assigned Serial number 10-2015-0092558, and of a Korean patent application filed on Jul. 23, 2015 in the Korean Intellectual Property Office and assigned Serial number 10-2015-0104587, the entire disclosure of each of which is hereby incorporated by reference.

TECHNICAL FIELD

The present disclosure relates to a method and an apparatus for providing a service in a wireless communication system. More particularly, the present disclosure relates to a method and an apparatus for providing a priority service in a wireless communication system.

BACKGROUND

In order to meet increased demand for wireless data traffic since the deployment of fourth generation (4G) communication systems, efforts have been made to develop an improved fifth generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. In order to decrease propagation loss of the radio waves and increase the transmission distance, the implementation of beamforming, massive multiple-input multiple-output (MIMO), full dimensional MIMO (FD-MIMO), array antenna, analog beam forming, large scale antenna techniques have been proposed or discussed with regard to 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (acronym being FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

Meanwhile, a public safety-LTE (PS-LTE) uses a mission critical push to talk (MCPTT) over LTE technology to provide a service, which may perform communication for public safety, in disasters to a user.

Therefore, the terminal can need to notify other terminals of its own emergency situation when the emergency situation happens. The MCPTT user may use the MCPTT technology to assist the relief for the emergency situation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing a service in a wireless communication system.

Another aspect of the present disclosure is to provide an apparatus and method for providing a priority service in a wireless communication system.

Another aspect of the present disclosure is to provide a method and an apparatus for setting priority for a user, a group, and a service in an MCPTT system.

Another aspect of the present disclosure is to provide a method and an apparatus use to control a service in a terminal and a server based on priority and a system thereof.

Another aspect of the present disclosure is to provide a message flow for providing a service based on priority.

Another aspect of the present disclosure is to provide a method and an apparatus for transmitting a message to allow a terminal to notify other terminals of an emergency situation when the emergency situation happens and setting a call.

In accordance with an aspect of the present disclosure, a method of a terminal for mission critical push to talk (MCPTT) is provided. The method includes receiving a first service request related to MCPTT over long term evolution (LTE), determining whether a first service corresponding to the first service request and a second service request being currently performed are simultaneously provided, and processing the first service and the second service based on a priority of each of the services, if the first service and the second service are not simultaneously provided.

In accordance with another aspect of the present disclosure, a terminal is provided. The terminal includes a transceiver configured to transmit and receive a signal and a controller or processor configured to receive a first service request related to MCPTT over LTE, determine whether a first service corresponding to the first service request and a second service request being currently performed are simultaneously provided, and process the first service and the second service based on a priority of each of the services, if the first service and the second service are not simultaneously provided.

In accordance with another aspect of the present disclosure, a method of an MCPTT server is provided. The method includes receiving a first service request from a first terminal, wherein the first service request is related to a second terminal, determining whether a first service corresponding to the first service request and a second service which is currently being performed by the second terminal are simultaneously provided by the second terminal, determining a process of the first service and the second service based on a priority of each of the services if the first service and the second service are not simultaneously provided, and transmitting a service request message to the second terminal based on the determination.

In accordance with another aspect of the present disclosure, an MCPTT server is provided. The MCPTT server includes a transceiver configured to transmit and receive a signal and a controller or processor configured to receive a first service request from a first terminal, wherein the first service request is related to a second terminal, determine whether a first service corresponding to the first service request and a second service which is currently being performed by the second terminal are simultaneously provided by the second terminal, determine a process of the first service and the second service based on a priority of each of the services if the first service and the second service are not simultaneously provided, and transmit a service request message to the second terminal based on the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
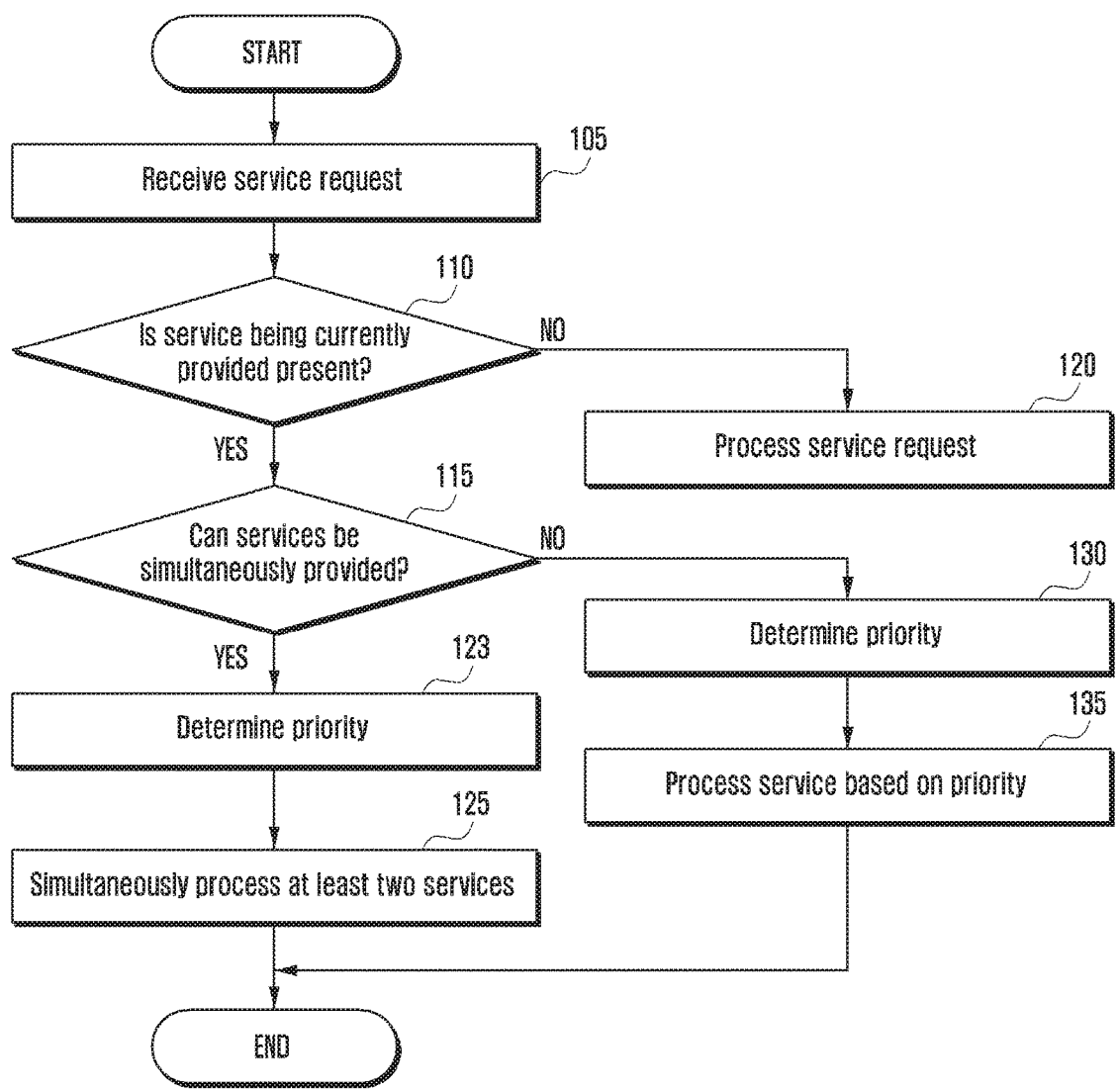
FIG. 1 is a flow diagram illustrating operations for processing a service based on priority according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, detailed description of various embodiments of the present disclosure will be made mainly based on wireless internet protocol (IP) multimedia subsystem (IMS) and user equipment (UE) defined by the 3rd Generation Partnership Project (3GPP) and session initiation protocol (SIP) of the Internet Engineering Task Force (IETF). However, the subject matter of the present disclosure may also be applied to other communication systems having a similar technical background after a little modification without departing from the scope of the present disclosure, and this may be determined by those skilled in the art.

In various embodiments of the present disclosure, priority with respect to mission critical push to talk (MCPTT) users, MCPTT groups, and MCPTT services is set, and the present disclosure is characterized by terminal and server operation processes based on the set priority.

Further, the present disclosure is characterized by a message flow process for providing services based on priority between MCPTT users and MCPTT servers according to an embodiment of the present disclosure.

Public safety long term evolution (PS-LTE) provides a communication service for disaster situation or public safety to users by using MCPTT over LTE. The MCPTT, one of technologies defined by 3GPP, provides functions including group communications between users, one-to-one communication, urgent call, disaster alert, ambience listening, etc.

The MCPTT service is provided using a terminal, an evolved packet system (EPS), an SIP core, and an MCPTT application server. The EPS may mean an LTE network, and the SIP core, which is a network device using the SIP, may mean the IMS. The MCPTT service may be arranged in various structures. An MCPTT operator may operate the EPS, the SIP core, and the MCPTT application server, and the MCPTT operator may also provide the service by operating the SIP core and the MCPTT application server and interworking with the EPS of other operators. Further, the MCPTT operator may provide the service by operating only the MCPTT application server and interworking with the EPS and the SIP core of other operators.

Functional elements of the MCPTT service may be largely classified into group management, session control, and media control. The group management is to manage subscription information for a group where the user belongs, priority of the group, permitted roles in the group, call type that may be used in the group, and the like. The session control is to control a signal for registration for the MCPTT service by the user, and a signal for call session such as starting, changing, or ending group call. All of the session management signals sent by the MCPTT user are controlled/managed through the MCPTT application server.

The media control is for controlling a transmission/reception permission for media transmitted by the user to a use group call, one-to-one call, disaster alert, or the like provided by the MCPTT service, and to control resources. All the media information transmitted by the MCPTT user is delivered to another user through a media gateway provided by the MCPTT service. A group management server for group management may be located together with the MCPTT application server, and is logically distinguished from the MCPTT application server by its function. The media gateway for media control may be connected to the terminal, the EPS, and the MCPTT application server without passing through the SIP core. The media gateway controls transmission/reception right of the user, and this may be called floor control. The media gateway may be located together with the MCPTT application server, and has a function logically distinguished from the MCPTT application server.

The MCPTT service may largely be classified into a group call, one-to-one call, and an emergency alert. The group call may support a general group call for group communication required for public safety, such as an emergency call providing communication with top priority in a case in which an urgent/emergency situation occurs (e.g., an earth quake, a tsunami, an act of terrorism or the like), and an imminent peril call providing group communication for an imminent situation (e.g., bad weather, increased traffic congestion, or the like) with a priority (or urgency) lower than that of the emergency call. The one-to-one call may support a general call, an emergency call, and an ambient listening function for listening ambient sound of the opposite party.

The MCPTT user may be divided into various categories. That is, a general MCPTT user (not authorized), an authorized MCPTT user, and an authorized MCPTT service provider.

The MCPTT user may be provided with the service from a plurality of MCPTT service providers. The MCPTT user may perform group communication or one-to-one communication with an MCPTT user having partnership by interworking with an MCPTT service provider having partnership in addition to the main MCPTT service provider.

The MCPTT terminal may receive basic information for receiving the MCPTT service from the MCPTT service provider. The MCPTT terminal may receive information on a user identifier, a group identifier, roles in the group, permitted call type in the group, whether one-to-one call is possible, and placement type, report information to be reported to the MCPTT server, information on the EPS and the SIP core for supporting various placement types, and information for accessing the MCPTT application server.

The MCPTT service provider may provide and control the service based on priority. The MCPTT terminal may control the service based on the priority.

The MCPTT priority service requirements may not be satisfied by priority and quality of service (QoS) level based on subscription, fixed differentiation, and service provided by a limited operator in the current communication system. Therefore, a method for setting and processing subdivided level of priority is provided in the present disclosure to address the issues above.

The embodiment of the present disclosure suggests a method and a procedure for setting priority with respect to a user, a group, and a service in the MCPTT system. Further, the embodiment of the present disclosure suggests a procedure, an apparatus, and a system used for a method for controlling the service in a terminal and a server based on the priority. In addition, the embodiment of the present disclosure suggests a message flow for providing the service based on the priority.

The present disclosure relates to a method and an apparatus for providing a service based on priority in the communication system.

There are three objects for which priority is set. Priority for each user, priority for each group, and priority for each service may be determined.

Corresponding priority may be set by a service provider providing the MCPTT service or an authorized MCPTT user.

The set priority value may be shared between the MCPTT user and the MCPTT server. The set priority may be shared in advance before the service is started, or may be shared at the same time as a service request.

An entity using the set priority value includes the MCPTT server, the MCPTT user, and the SIP core.

The priority may be used in a combination of one or more priority values. The MCPTT server may use the priority value for processing a service request when receiving the service request from the MCPTT user. Further, the MCPTT user may use the priority value for managing service currently being provided. In addition, the priority value may be used for floor control The MCPTT user may use the priority value for processing a service request when receiving the service request. Further, the MCPTT user may use the priority value for managing service currently being provided. The SIP core may use the priority value for network resource management.

Characteristics of a method for processing a service based on priority according to the embodiment of the present disclosure are as follows. The service is processed based on priority values, which is not applied to the existing communication system. Further, processing of the service varies depending on a kind of media (audio, video, text, etc.) required for the service. The kind of media may be additionally subdivided. According to the embodiment of the present disclosure, the media may be divided into media (media type A) that may be simultaneously provided and media (media type B) that may not be simultaneously provided. For example, in a case of chatting, since media may be simultaneously provided (media type A), a service having high priority and a service having low priority may be simultaneously provided. Whereas, in a case of audio that may not be simultaneously provided (media type B), audio of a service having high priority is provided first. Further, when a user has a plurality of terminals, a terminal to which the service is to be provided is determined based on priority. Further, when users more than the number of users the network may support are in one network, the service may be provided to a user having high priority first for guaranteeing QoS.

FIG. 1 is a flow diagram illustrating operations for processing a service based on priority according to an embodiment of the present disclosure.

Referring to FIG. 1, in operation 105, the mission critical push to talk (MCPTT) terminal may receive a service request. The service request may be a new service request.

In operation 110, the MCPTT terminal may determine whether there is a service currently being provided. The service may be an MCPTT service. When there is a service currently being provided, the MCPTT terminal proceeds to operation 115, and when there is no service currently being provided, the MCPTT terminal proceeds to operation 120.

In operation 120, the MCPTT terminal may process the service requested in operation 105.

In operation 115, the MCPTT terminal may determine whether the service currently being provided and the service corresponding to the new service request may be simultaneously provided. When the service currently being provided and the service corresponding to the new service request may be simultaneously provided, the MCPTT terminal proceeds to operation 123, and when the service currently being provided and the service corresponding to the new service request may not be simultaneously provided, the MCPTT terminal proceeds to operation 130. For example, in the case in which medium provided by each service is in audio, the audio service may not be simultaneously provided. But in the case in which the medium provided by each service is in text, both services may be simultaneously provided. In a case in which one service provides audio, and the other service provides text, media of the services may be simultaneously provided depending on the performance of the terminal. As such, whether each service may be simultaneously provided may be determined depending on the type of the service and the performance of the terminal.

In operation 123, the MCPTT terminal determines priority of the services. The operation 123 can be omitted. In operation 125, the MCPTT terminal simultaneously provides the service currently being provided and the service corresponding to the new service request. For example, MCPTT terminal process the services based on the priority of the services.

In a case of proceeding to operation 130, the MCPTT terminal determines priority. The MCPTT terminal may determine priority of the service currently being provided and the service corresponding to the new service request.

In operation 135, the MCPTT terminal may provide the service based on the priority of the service currently being provided and the service corresponding to the new service request. For example, the MCPTT terminal may process a service having higher priority first. The MCPTT terminal may drop or hold a service having lower priority. Further, the MCPTT terminal may change the service to a service that may be simultaneously provided and provide the changed service, or may transfer the service to another terminal of the user of the MCPTT terminal.

Meanwhile, the operations in FIG. 1 may also be applied to the MCPTT server as well as the MCPTT terminal. When receiving a service request from a first terminal, the MCPTT server transfers the service request to a second terminal. The operations described in FIG. 1 are operations of the second terminal that received the service request. However, the operations of FIG. 1 may also be applied before the service request is transferred to the second terminal from the MCPTT server that received the service request from the first terminal.

That is, the MCPTT server may determine whether there is a service currently being provided to the second terminal. When there is no service currently being provided, the MCPTT server immediately transfer the service request, and when there is a service currently being provided, the MCPTT server may determine whether the service currently being provided to the second terminal and a service corresponding to the service request may be simultaneously provided. Depending on the determination result, the service request may be transferred such that both services are simultaneously provided, or the service request may be transmitted such that priority of both services is determined and the second terminal provides the service based on the priority when it is determined that the services may not be simultaneously provided.

Figure 2:
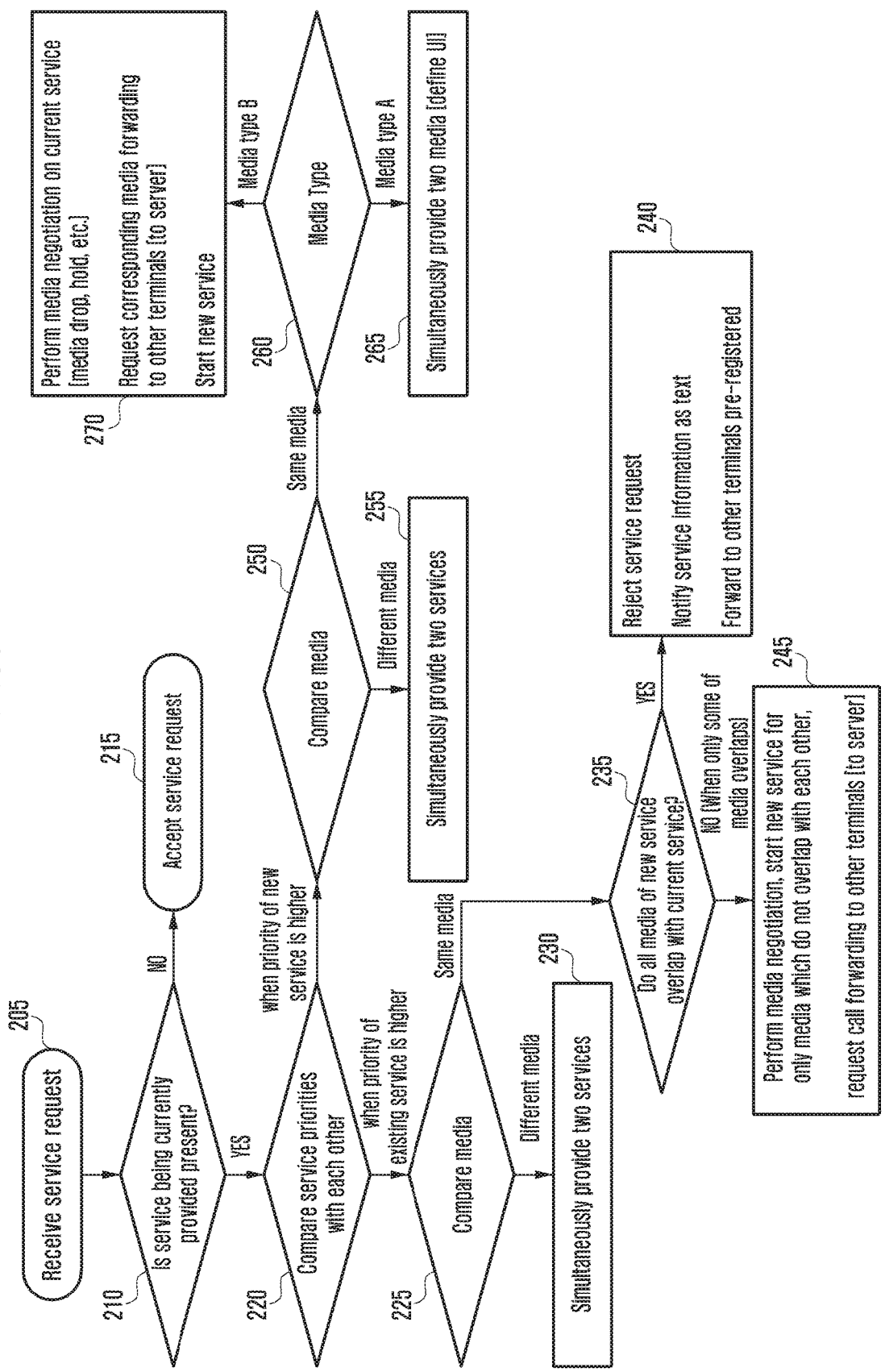
FIG. 2 is a flow diagram illustrating operations of a terminal for processing a service based on priority according to an embodiment of the present disclosure.

FIG. 2 is a flow diagram illustrating operations of a terminal for processing a service based on priority according to an embodiment of the present disclosure.

Referring to FIG. 2, in operation 205, the MCPTT terminal receives new service request. In operation 210, the MCPTT terminal may determine whether there is a service currently being provided. When there is a service currently being provided, the MCPTT terminal proceeds to operation 220, and when there is no service currently being provided, the MCPTT terminal proceeds to operation 215.

When there is no service currently being provided, the MCPTT terminal proceeding to operation 215 accepts the service request. The MCPTT terminal may process the requested service.

When there is a service currently being provided, the MCPTT terminal proceeds to operation 220, and the operation compares priority of the service currently being provided and the newly requested service.

When priority of the service currently being provided is higher, the MCPTT terminal proceeds to operation 225, and when priority of the newly requested service is higher, the MCPTT terminal proceeds to operation 250.

When the priority of the service currently being provided is higher, the MCPTT terminal proceeding to operation 225 compares media provided by the services. The MCPTT terminal may determine whether the services may be simultaneously provided by comparing the types of media of the corresponding services. When the services may be simultaneously provided, the MCPTT terminal proceeds to operation 230, and when the services may not be simultaneously provided, the MCPTT terminal proceeds to operation 235.

As illustrated in FIG. 2, when the services may be simultaneously provided, the MCPTT terminal proceeds to operation 230 and may simultaneously provide the services.

In a case of media that may not be simultaneously provided, the MCPTT terminal proceeding to operation 235 may compare the media provided by the services to process the services. For example, in operation 235, the service may be processed depending on whether all the media of the current service and the new service are overlapped with each other. For example, some of the services may be adjusted. In this case, the adjustment may be performed on the MCPTT server or the opposite terminal transmitting the service request and the corresponding medium of the corresponding service.

For example, when all the media of the new service overlap with all the media of the current service, the MCPTT terminal proceeds to operation 240. In operation 240, the MCPTT terminal may adjust the service. Since it is the case in which the priority of the service currently being provided is higher, the MCPTT terminal may adjust the newly requested service (new service). The MCPTT terminal may reject the new service request. When rejecting the service request, the MCPTT terminal may notify the MCPTT server or the opposite terminal of the rejection.

The corresponding medium of the corresponding service may be stored in the MCPTT terminal or the MCPTT server and then transmitted later. The MCPTT terminal may hold the new service request, and provide the newly requested service when the service currently being provided ends. In this case, when some media end first in the service currently being provided, a medium of the held new service that does not collide with the medium of the service currently being provided may be provided first. Further, the new service information may be stored and then the new service may be executed when the stored information may be confirmed.

Further, corresponding type of the medium of the new service may be converted. For example, the corresponding type of the medium of the new service may be converted to a medium that does not collide with the service currently being provided to be provided, or may be converted to a medium capable of being provided simultaneously with the medium currently being provided to be provided. For example, audio may be changed to text to be displayed on a user terminal. In addition, the new service information may also be provided as text.

Further, the new service may also be transmitted to another terminal of the user of the MCPTT terminal. In order to transmit the corresponding medium of the corresponding service to another terminal of the same user, device capability of another terminal of the same user may be considered.

In operation 220, as illustrated in FIG. 2, when the priority of the new service is higher, the MCPTT terminal proceeds to operation 250. The MCPTT terminal compares media provided by the services. The MCPTT terminal determines whether media provided by both services are the same as each other by comparing the types of the media of the corresponding services. When the services provide different media, the MCPTT terminal proceeds to operation 255, and when both services provide the same medium, the MCPTT terminal proceeds to operation 260.

When the services provide different media, it is determined that the services may be simultaneously provided, and the MCPTT terminal proceeds to operation 255 and may simultaneously provide the services.

When the media provided by both services are the same as each other, the MCPTT terminal proceeds to operation 260 to determine the type of the medium. The MCPTT terminal may determine whether the media may be simultaneously provided by determining the types of the media. For example, in the embodiment of the present disclosure, each medium may be classified as media type A or media type B. The media type A is a type in which two media may be simultaneously provided, and the media type B is a type in which two media may not be simultaneously provided.

When both services provide media that may be simultaneously provided, the MCPTT terminal proceeds to operation 265 to provide the service.

When the services provide media that may not be simultaneously provided, the MCPTT terminal proceeds to operation 270. In operation 270, the MCPTT terminal may adjust the service currently being provided to provide the service. In operation 220, since it is the case in which the priority of the new service is higher, the service currently being provided may be adjusted.

The MCPTT terminal may reject the service currently being provided. When rejecting the service, the MCPTT terminal may notify the MCPTT server or the opposite terminal of the rejection.

The corresponding service currently being provided may be stored in the MCPTT terminal or the MCPTT server and then transmitted later. The MCPTT terminal may hold the service currently being provided, and provide the service currently being provided when the new service ends. In this case, when some media end first in the new service, a medium of the held service that does not collide with the medium of the new service may be provided first. Further, the information of the service currently being provided may be stored and then the service may be executed when the stored information may be confirmed.

Further, corresponding type of the medium of the service currently being provided may be converted. For example, the corresponding type of the medium of the service currently being provided may be converted so that the medium of the service currently being provided does not collide with the medium provided by the new service. The medium of the service currently being provided may be changed to a medium which may be provided simultaneously with the medium of the new service and may be provided. For example, audio may be changed to text to be displayed on a user terminal. In addition, the new service information may also be provided as text.

The MCPTT service may be provided based on priority as described above.

Figure 3:
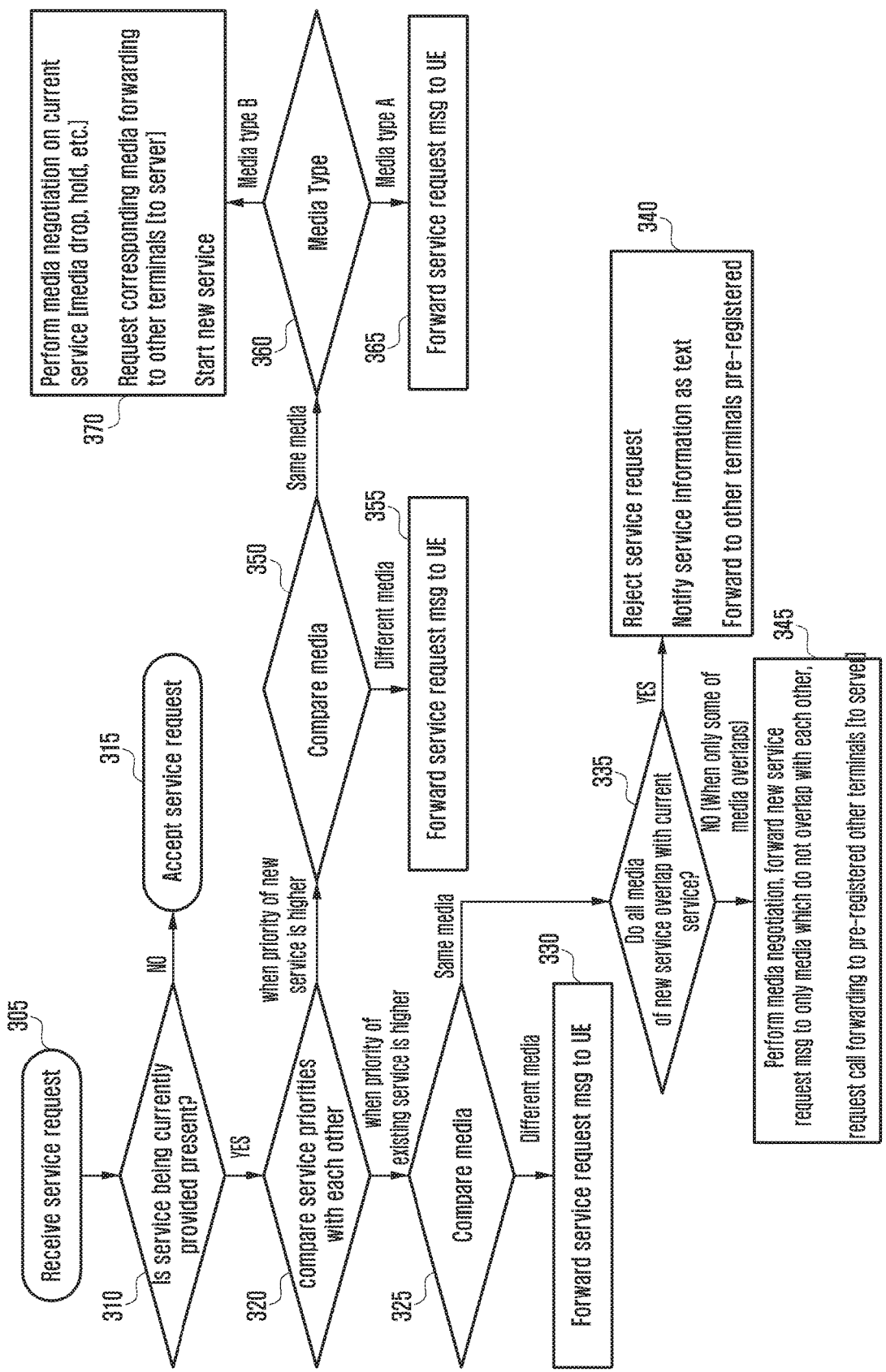
FIG. 3 is a flow diagram illustrating operations of a server for processing a service based on priority according to an embodiment of the present disclosure.

FIG. 3 is a flow diagram illustrating operations of a server for processing a service based on priority according to an embodiment of the present disclosure. In operation 305, the MCPTT server receives a new service request from the first terminal. When receiving the new service request from the MCPTT user (the user of the first terminal), the request passes through the MCPTT server and is transferred to a target terminal (the second terminal).

Referring to FIG. 3, in operation 310, the MCPTT server receiving the new service request may confirm whether there is a service currently being provided to the corresponding MCPTT terminal (the second terminal). When there is no service currently being provided, the MCPTT server proceeds to operation 315, and when there is a service currently being provided, the MCPTT server proceeds to operation 320.

In operation 315, since there is no MCPTT service currently being provided to the second terminal, the MCPTT server transfers the corresponding new service request to the second terminal.

When there is a service currently being provided, the MCPTT server proceeds to operation 320. The MCPTT server proceeding to operation 320 compares priority of the service currently being provided and the newly requested service. When priority of the service currently being provided is higher, the MCPTT server proceeds to operation 325, and when priority of the newly requested service is higher, the MCPTT server proceeds to operation 350.

When the priority of the service currently being provided is higher, the MCPTT server proceeding to operation 325 compares media provided by the services. The MCPTT server may determine whether the services may be simultaneously provided by comparing the types of media of the corresponding services. When the services may be simultaneously provided, the MCPTT server proceeds to operation 330, and when the services may not be simultaneously provided, the MCPTT server proceeds to operation 335.

When the services may be simultaneously provided, the MCPTT server proceeds to operation 330 and may simultaneously provide the services.

In a case of media that may not be simultaneously provided, the MCPTT server proceeding to operation 335 may compare the media provided by the services to process the services. For example, in operation 335, the service may be processed depending on whether all the media of the current service and the new service are overlapped with each other. For example, some of the services may be adjusted. In this case, the adjustment may be performed on the MCPTT server or the opposite terminal transmitting the service request and the corresponding medium of the corresponding service.

For example, when all the media of the new service overlap with all the media of the current service, the MCPTT server proceeds to operation 340. In operation 340, as illustrated in FIG. 3, the MCPTT server may adjust the service. Since it is the case in which the priority of the service currently being provided is higher, the MCPTT server may adjust the newly requested service (new service). The MCPTT server may reject the new service request. When rejecting the service request, the MCPTT server may notify the MCPTT service-related terminal of the rejection.

The corresponding medium of the corresponding service may be stored in the MCPTT server and then transmitted later. The MCPTT server may hold the new service request, and provide the newly requested service when the service currently being provided ends. In this case, when some media end first in the service currently being provided, a medium of the held new service that does not collide with the medium of the service currently being provided may be provided first. Further, the new service information may be stored and then the new service may be executed when the stored information may be confirmed.

Further, the MCPTT server may convert corresponding type of the medium of the new service. For example, the corresponding type of the medium of the new service may be converted to a medium that does not collide with the service currently being provided to be provided, or may be converted to a medium capable of being provided simultaneously with the medium currently being provided to be provided. For example, audio may be changed to text to be displayed on a user terminal. In addition, the new service information may also be provided as text.

Further, the MCPTT server may also transmit the new service to another terminal of the user of the MCPTT terminal. In order to transmit the corresponding medium of the corresponding service to another terminal of the same user, device capability of another terminal of the same user may be considered.

As illustrated in FIG. 3, in operation 320, when the priority of the new service is higher, the MCPTT server proceeds to operation 350. The MCPTT server compares media provided by the services. In particular, the MCPTT server determines whether media provided by both services are the same as each other by comparing the types of the media of the corresponding services. When the services provide different media, the MCPTT server proceeds to operation 355, and when both services provide the same medium, the MCPTT server proceeds to operation 360.

When the services provide different media, it is determined that the services may be simultaneously provided, and the MCPTT server proceeds to operation 355 and may simultaneously provide the services.

When the media provided by both services are the same as each other, the MCPTT server proceeds to operation 360 to determine the type of the medium. The MCPTT server may determine whether the media may be simultaneously provided by determining the types of the media. For example, in the embodiment of the present disclosure, each medium may be classified as media type A or media type B. The media type A is a type in which two media may be simultaneously provided, and the media type B is a type in which two media may not be simultaneously provided.

When both services provide media that may be simultaneously provided, the MCPTT server proceeds to operation 365 to provide the service.

When the services provide media that may not be simultaneously provided, the MCPTT server proceeds to operation 370. In operation 370, the MCPTT server may adjust the service currently being provided to provide the service. In operation 320, since it is the case in which the priority of the new service is higher, the service currently being provided may be adjusted.

The MCPTT server may reject the service currently being provided. When rejecting the service, the MCPTT server may notify the MCPTT service-related terminal of the rejection.

The MCPTT server may store the service currently being provided and transmit the service later. The MCPTT server may hold the service currently being provided, and provide the service currently being provided when the new service ends. In this case, when some media end first in the new service, a medium of the held service that does not collide with the medium of the new service may be provided first.

Further, the MCPTT server may convert corresponding type of the medium of the service currently being provided. For example, the corresponding type of the medium of the service currently being provided may be converted so that the medium of the service currently being provided does not collide with the medium provided by the new service. The medium of the service currently being provided may be changed to a medium that may be provided simultaneously with the medium of the new service, and provided. For example, audio may be changed to text to be displayed on a user terminal. In addition, the new service information may also be provided as text.

According to the method as described above, the MCPTT server may provide the MCPTT service by adjusting the media provided the services as needed based on priority of the service currently being provided to the second terminal and the new service.

The SIP core receiving a service request message may use the priority value to manage network resources for the corresponding service.

Figure 4:
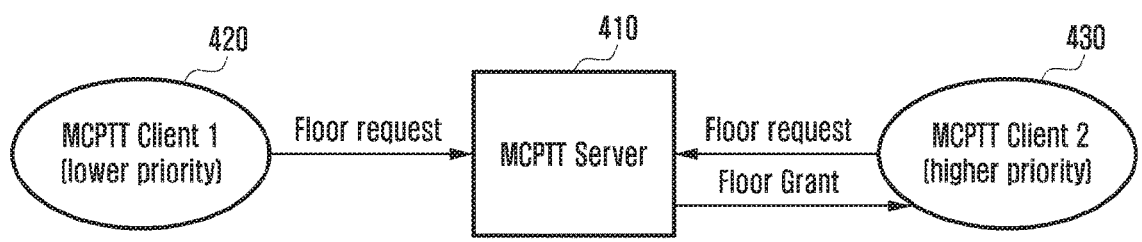
FIG. 4 is a diagram illustrating a process of floor control based on priority values according to an embodiment of the present disclosure.

FIG. 4 is a diagram illustrating a process of floor control based on priority values according to an embodiment of the present disclosure.

Referring to FIG. 4, an MCPTT server 410 may receive a floor request from a MCPTT client 1 420 and MCPTT client 2 430. For example, it is assumed that situation of FIG. 4 is group communication situation. The group communication may be group call.

A plurality of clients (1 and 2) 420 and 430 may participate in the group call. When the clients participate in the group call, a terminal that wants to transmit data transmits the floor request to the MCPTT server 410 in order to prevent communication collision between different clients. The MCPTT server 410 receiving the floor request transmits floor grant. A client receiving the floor grant may transmit data.

According to the embodiment of the present disclosure, when the MCPTT server 410 receiving the floor request transmits the floor grant, the MCPTT server 410 may transmit the floor grant to a terminal having higher priority first among the plurality of terminals. In the embodiment of FIG. 4, it is assumed that the MCPTT client2 430 has higher priority than the MCPTT client 1 420. Therefore, when receiving the floor request from the MCPTT client 1 420 and the MCPTT client2 430, the MCPTT server 410 may transmit the floor grant to the MCPTT client2 430 having higher priority. When the priority of the MCPTT client 1 420 and the priority of the MCPTT client2 430 are the same as each other, an order in which the floor request is received, or the like may be additionally considered.

Figure 5:
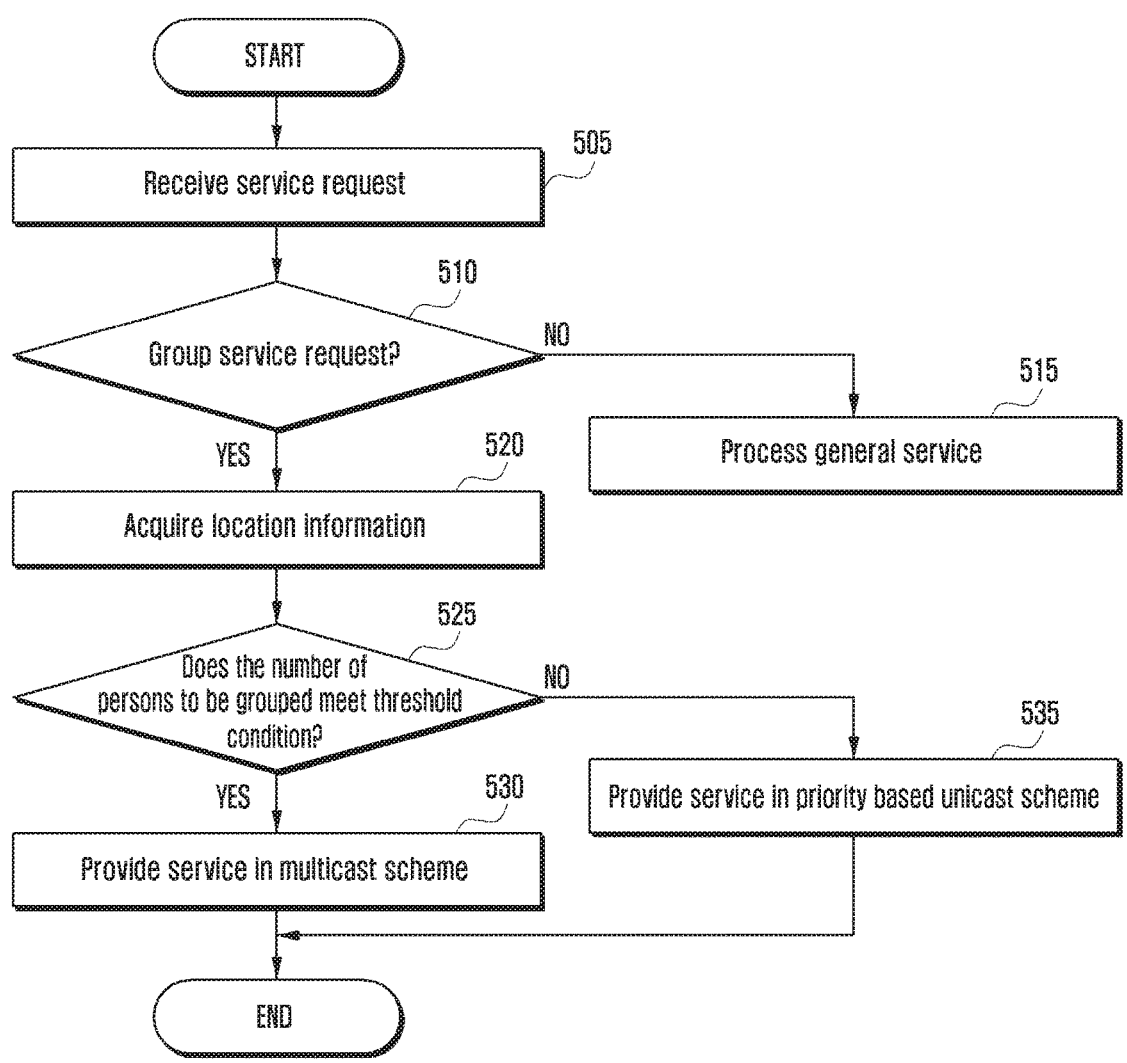
FIG. 5 is a diagram illustrating a process of providing a quality of service (QoS) in a network based on priority and location information of a terminal according to an embodiment of the present disclosure.

FIG. 5 is a flow diagram illustrating a process of providing quality of service (QoS) in a network based on priority and location information of a terminal according to an embodiment of the present disclosure.

Referring to FIG. 5, when the MCPTT server receives a group communication (for example, group call service) request, the MCPTT server needs to transfer the group call service request to each user belonging to the group and provide the group call service. Here, a method of applying an order of transferring the service request based on the number of users participating in each group call, and/or priority of the users, will be described.

In operation 505, the MCPTT server may receive a service request. The service request may be a group service request, a group call service.

In operation 510, the MCPTT server may determine whether the requested service is a group service request. The group service may include the group communication request, the group call service. When the requested service is not the group service request, the MCPTT server proceeds to operation 515, and when the requested service is the group service request, the MCPTT server proceeds to operation 520.

If the MCPTT server proceeds to operation 515, the MCPTT server may process the requested service according to a general procedure. For example, the MCPTT server may process the service according to the method described in FIGS. 1 to 3.

When proceeding to operation 520, the MCPTT server may perform an operation for processing the group service. The embodiments described through FIGS. 1 to 3 may be applied even to the case of the group service.

As illustrated in FIG. 5, in operation 520, the MCPTT server may acquire location information of a group service target terminal.

The MCPTT server may apply the following methods to acquire location information of a group service target user. According to a first method, when the MCPTT terminal accesses the network to be registered to the MCPTT server, identification (ID) information of the network the terminal currently accesses may be transmitted. Further, the ID information of the network accessed by the terminal is updated and reported every time the terminal moves and the network accessed by the terminal is changed. According to a second method, when the MCPTT server receives the group call service request, the MCPTT server may know the location information of the terminal by asking the network. When the network knows the corresponding information, the network may notify the MCPTT server. When the network does not know the corresponding information, the MCPTT server may send a message to a terminal in an idle state to acquire network ID information. In a case of the second method, information on the real time number of users accessing the corresponding network may be notified. The MCPTT server may transmit SIP invite to the group call service target terminal after receiving the group call service request. Each group call service target terminal may transmit a response message, and the response message may include location information of each group call service target terminal.

The location information of the terminal requesting the group call service may also be confirmed when the service request is received from the service MCPTT server. For example, the location information may be transmitted according to the group call service request. In the case of using the IMS based SIP protocol, the terminal requesting the group call service may transmit user location information included in a header of an SIP request. That is, at the time of transmitting a group call request invite, network information may be put in a header of a request message. The network information may be location information and may be a cell ID of a cell which the terminal accesses. When no location information of a group call request is present or the location information is not used, a method for acquiring location information described above may also be used. Other than a person requesting the group call, information on a person to be grouped may be obtained, but information on other children may be obtained later. The server transmits an invite. The server transmits a response, in which the location information may be present in the response.

After the MCPTT server is able to acquire the location information in operation 520, the process proceeds to operation 525. As illustrated in FIG. 5, in operation 525, the MCPTT server may determine whether the number of group call service target terminals meets a preset threshold condition. The threshold condition is a threshold condition to determine whether to provide the group service in multicast or unicast when the group service is provided. For example, when the terminal having the preset threshold value or more is the group call service target terminal, media for a group service may be provided in the multicast. Since the same media are transmitted to multiple target persons, when the number of group service target terminals is equal to or more than the predetermined number, transmitting the group service using the multicast scheme may be advantageous in terms of resource efficiency.

When the number of group service target terminals meets the preset threshold condition, the process proceeds to operation 530. The MCPTT server may provide the media for the group service using the multicast scheme. Meanwhile, the media may be provided in the multicast scheme, but in the case of the signaling, the media may be provided in the unicast scheme. When the signaling is transmitted, a signaling order may be determined based on the priority of the group service target terminal. For example, if the capacity of the cell for the group service is two-hundred (200) and the number of group service target terminals is two-hundred-and-fifty (250), the group service may not be provided to fifty (50) terminals. In this case, the group service may be provided by providing the signaling only to upper two-hundred (200) terminals according to the priority of the terminal.

When the number of group service target terminals does not meet the preset threshold condition, the process proceeds to operation 535. The MCPTT server may provide the media for the group service in the unicast scheme. The MCPTT server may sequentially provide the media to the group service target terminal based on priority when the media are provided. In addition, when the signaling is transmitted, the signaling order may be determined based on the priority of the group service target terminal.

When the terminals are intensively collected in a specific network, the MCPTT server based on the location information of the terminal first provides a service to a user having higher priority depending on the priority of the user if the number of group service target terminals is more than the number of network support users.

An emergency group call is one example of a service providing high priority by the MCPTT. The MCPTT system provides an MCPTT priority service to an MCPTT terminal via the terminal and several entities. FIGS. 6 to 14 illustrate a message flow in a process of providing an emergency group call service, which is one example of a priority service, through an MCPTT system.

The MCPTT terminal may transmit an alert message through an MCPTT network. The alert message includes the location information of the terminal, a user ID, a group ID, and affiliated group information. The MCPTT server transmitting the alert message confirms user authority transmitting the alert message. When sufficient information is not included in the alert message or even if sufficient information is included in the alert message, information in the alert message may be modified, added, and deleted. In accordance with the embodiment of the present disclosure, a client may be used together with the terminal. The terminal can need to notify other terminals of its own emergency situation when the emergency situation happens. The MCPTT user may use the following respective embodiments to assist the relief for the emergency situation.

Figure 6:
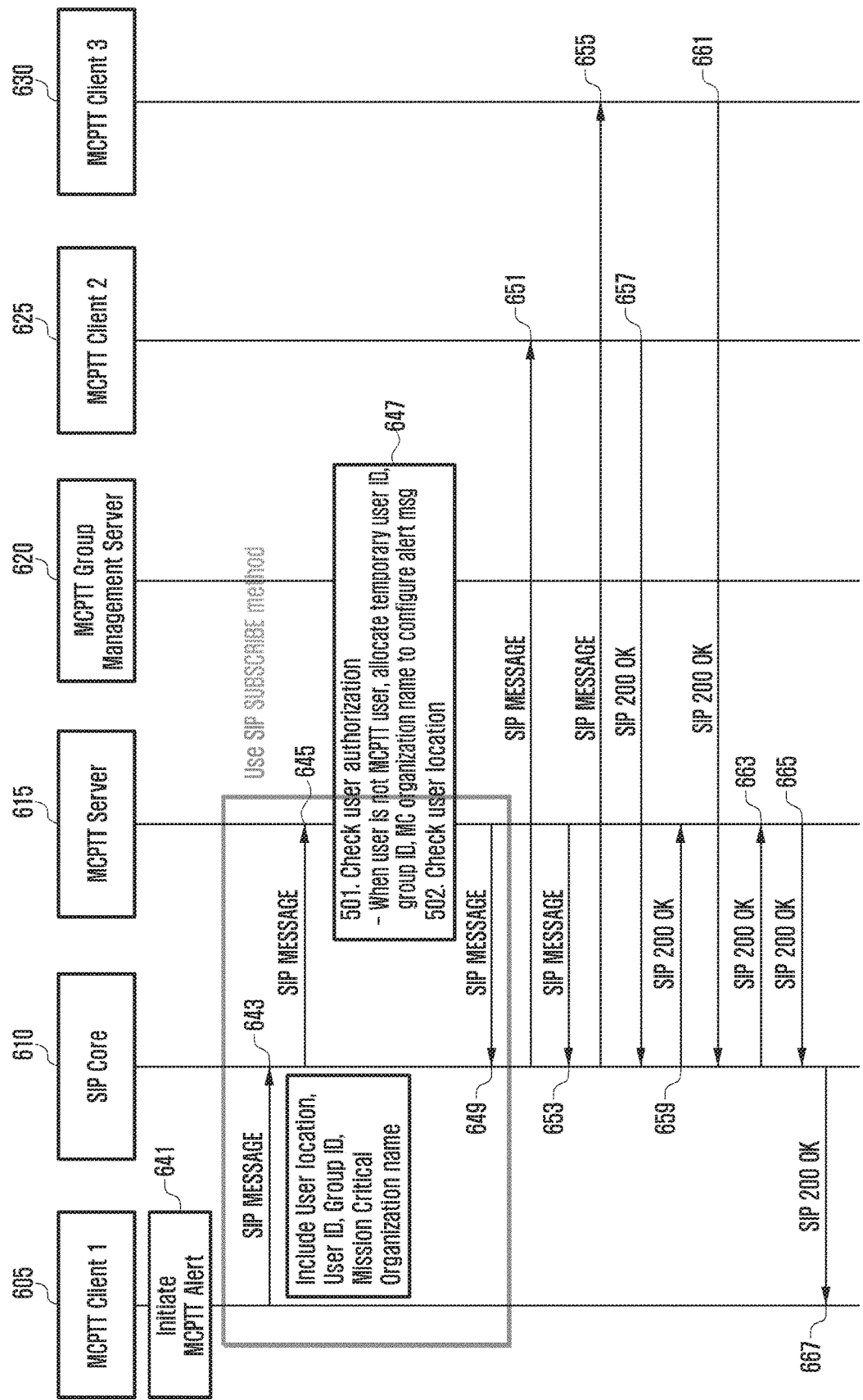
FIG. 6 is a diagram illustrating a process of transmitting an alert message using a session initiation protocol (SIP) message method according to an embodiment of the present disclosure.
Figure 7:
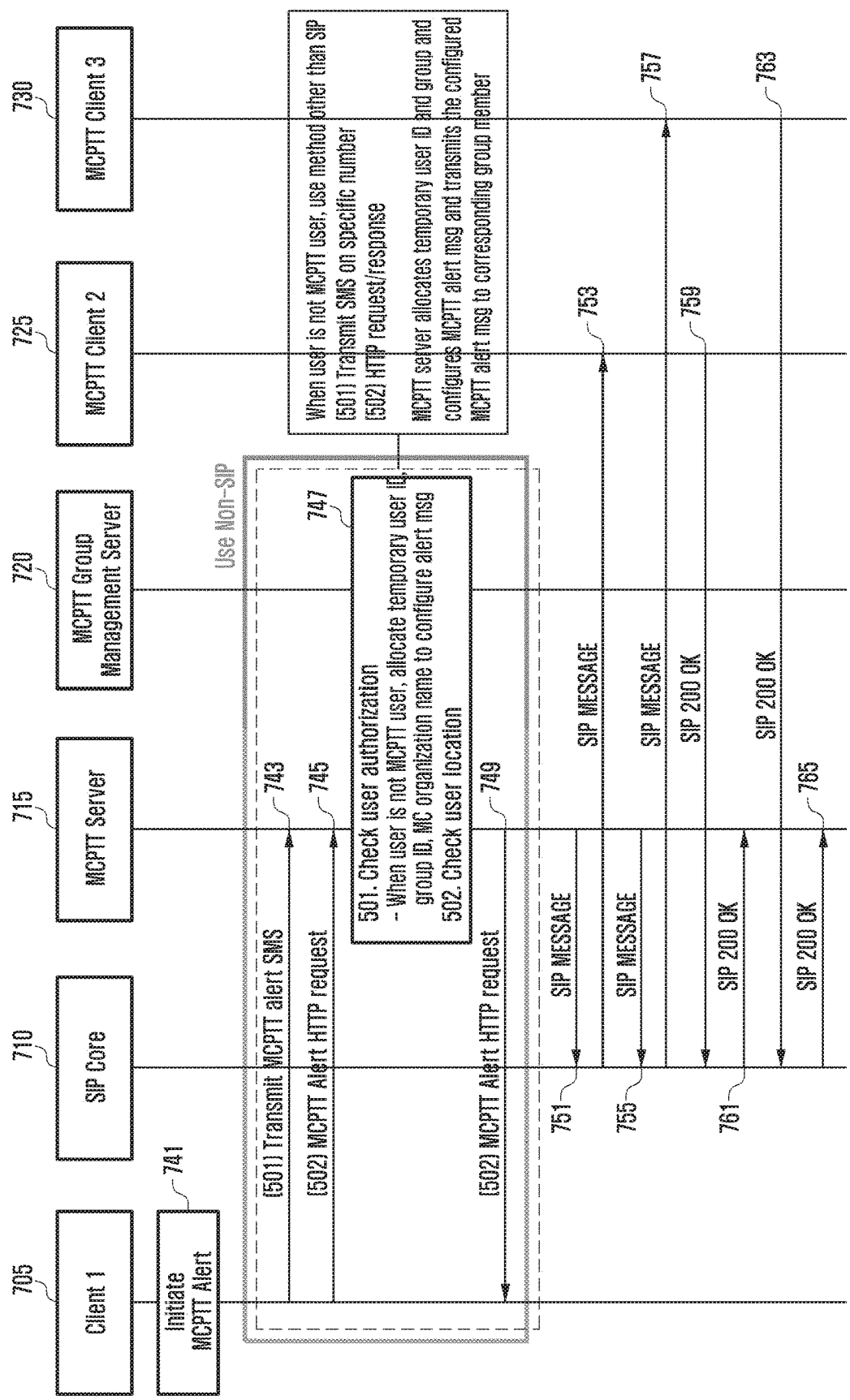
FIG. 7 is a diagram illustrating a process of transmitting an alert message by allowing a terminal to use a protocol, not to use SIP, according to an embodiment of the present disclosure.
Figure 8:
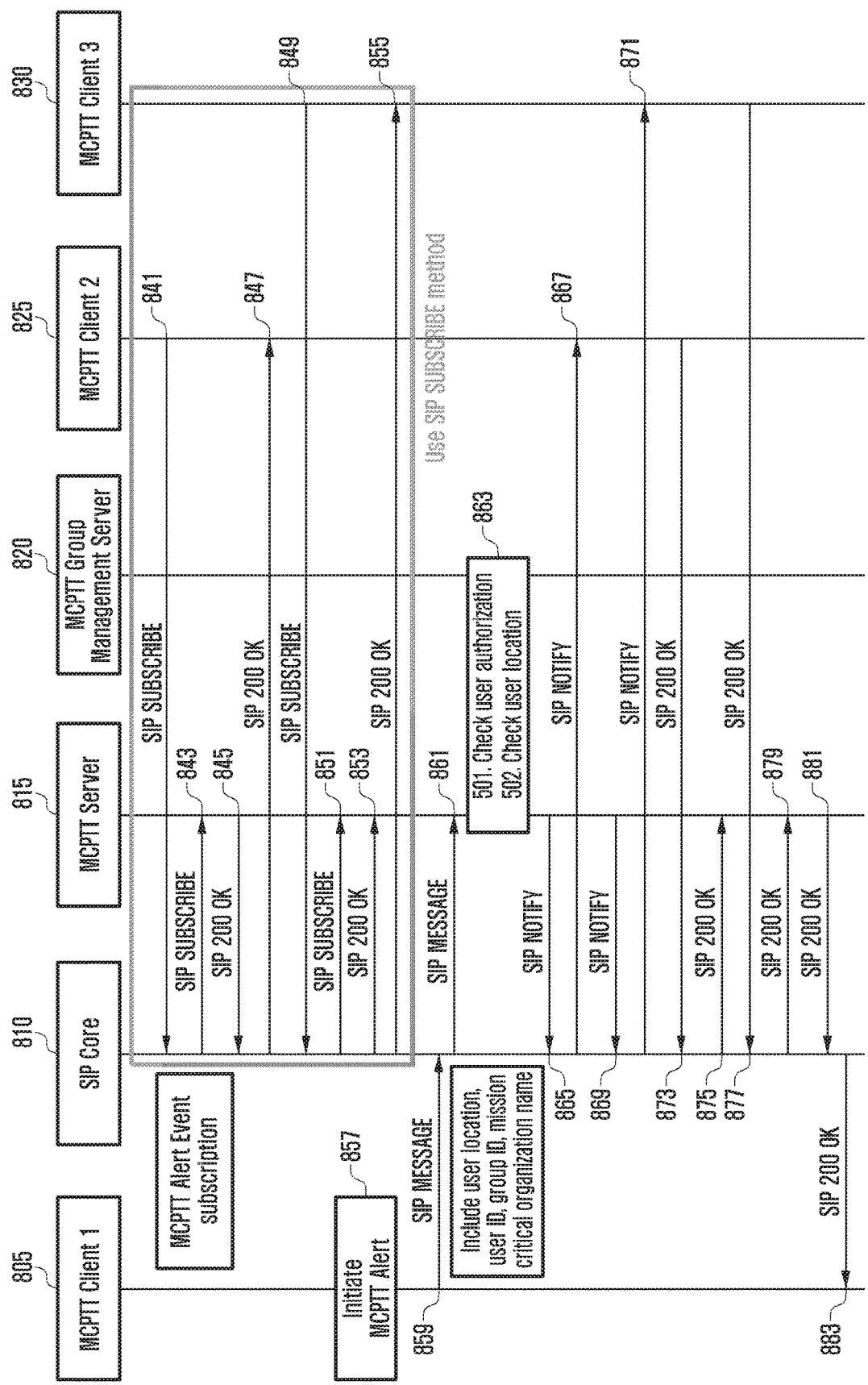
FIG. 8 is a diagram illustrating a process of transmitting an alert message using an SIP SUBSCRIBE and NOTIFY method according to an embodiment of the present disclosure.

FIGS. 6 to 8 illustrate a method for transmitting an alert message according to the embodiment of the present disclosure. The alert message may be transmitted prior to inviting, for example, an emergency call in the MCPTT service. An alert message related procedure may be an option in providing the MCPTT service.

FIG. 6 is a diagram illustrating a process of transmitting an alert message using an SIP message method according to an embodiment of the present disclosure.

Referring to FIG. 6, a mobile communication system may include an MCPTT client 1 605, an SIP core 610, an MCPTT server 615, and an MCPTT group management server 620. Further, the mobile communication system may further include an MCPTT client 2 625 and an MCPTT client 3 630. The MCPTT client may be used together with the MCPTT terminal. An MCPTT alert may be a message notifying that a terminal or a user of the terminal is in an emergency situation.

In process (or operation) 641, the MCPTT client 1 605 starts an MCPTT alert operation. In process 643, the MCPTT client 1 605 transmits an SIP message to an SIP core 610. The SIP message may include the location information of the terminal, the user ID, the group ID, and the affiliated group information. The SIP core 610 may transmit the SIP message to the MCPTT server 615. According to the embodiment, the location information may also be used to select a specific target to which a message is to be transmitted as well as indicating the location of the MCPTT client 1.

In process 647, the MCPTT server 615 may check user authority and/or a user location. The MCPTT server 615 may communicate with the MCPTT group management server 620 to check the user authority and the user location. The MCPTT server 615 may confirm the user authority and/or the location information transmitting the alert message to modify, add, and delete the information of the alert message when the alert message needs to be modified.

In process 649, the MCPTT server 615 transmits the SIP message to the SIP core 610. The SIP message may be a message in which some of its information may be modified, added, and deleted in the MCPTT server 615.

In process 651, the SIP core 610 transmits the SIP message to the MCPTT client 2 625 based on the SIP message received in the process 649.

In process 653, the MCPTT server 615 transmits the SIP message to the SIP core 610. The SIP message may be a message in which some of its information may be modified, added, and deleted in the MCPTT server 615.

In process 655, the SIP core 610 transmits the SIP message to the MCPTT client 3 630 based on the SIP message received in the process 653.

In process 657, the MCPTT client 2 625 transmits an SIP 200 OK to the SIP core 610. In process 659, the SIP core 610 transmits the SIP 200 OK to the MCPTT server 615 based on the SIP 200 OK received in the process 657.

In process 661, the MCPTT client 3 630 transmits the SIP 200 OK to the SIP core 610. In process 663, the SIP core 610 transmits the SIP 200 OK to the MCPTT server 615 based on the SIP 200 OK received in the process 661.

In process 667, the MCPTT server 615 transmits the SIP 200 OK to the SIP core 610 based on the received SIP 200 OK. In process 669, the SIP core 610 transmits the SIP 200 OK to the MCPTT client 1 605 based on the SIP 200 OK received from the MCPTT server 615.

By the foregoing method, an SIP message protocol may be used to transmit the alert message.

FIG. 7 is a diagram illustrating a process of transmitting an alert message by allowing a terminal to use a protocol, not to use SIP, according to an embodiment of the present disclosure.

Referring to FIG. 7, the mobile communication system may include a client 1 705, an SIP core 710, an MCPTT server 715, and an MCPTT group management server 720. Further, the mobile communication system may further include an MCPTT client 2 725 and an MCPTT client 3 730. In FIG. 7, the terminal may use a hypertext transfer protocol (HTTP) request/response, an SMS, or the like.

In process 741, the client 1 705 starts an MCPTT alert operation.

In process 743, the client 1 705 transmits an MCPTT alert short message service (SMS) to the MCPTT server 715. Alternatively, in process 745, the client 1 705 may transmit an MCPTT alert HTTP request to the MCPTT server 715. The MCPTT alert SMS and the MCPTT alert HTTP request may include the location information of the terminal, the user ID, the group ID, and the affiliated group information.

In process 747, the MCPTT server 715 may check the user authority and/or the user location. The MCPTT server 715 may communicate with the MCPTT group management server 720 to check the user authority and the user location. The MCPTT server 715 may confirm the user authority and/or the location information transmitting the MCPTT alert SMS or the MCPTT alert HTTP request to modify, add, and delete the information of the alert message when the alert message needs to be modified. If the user is not the MCPTT user, the MCPTT server 715 may use a method other than the SIP to transmit the SMS on a specific number or transmit the HTTP request/response. Further, the MCPTT server 715 may allocate a temporary user ID and group and configures an MCPTT message and transmit the configured MCPTT message to the corresponding group users.

In process 749, the MCPTT server 715 may transmit a response to the client 1. The response may be transmitted as an MCPTT alert HTTP response or an SMS.

In process 751, the MCPTT server 715 transmits the SIP message to the SIP core 710. The SIP message may be a message in which some of its information may be modified, added, and deleted in the MCPTT server 715.

In process 753, the SIP core 710 transmits the SIP message to the MCPTT client 2 725 based on the SIP message received in the process 751.

In process 755, the MCPTT server 715 transmits the SIP message to the SIP core 710. The SIP message may be a message in which some of its information may be modified, added, and deleted in the MCPTT server 715.

In process 757, the SIP core 710 transmits the SIP message to the MCPTT client 3 730 based on the SIP message received in the process 755.

In process 759, the MCPTT client 2 725 transmits the SIP 200 OK to the SIP core 710. In process 761, the SIP core 710 transmits the SIP 200 OK to the MCPTT server 715 based on the SIP 200 OK received in the process 759.

In process 763, the MCPTT client 3 730 transmits the SIP 200 OK to the SIP core 710. In process 765, the SIP core 710 transmits the SIP 200 OK to the MCPTT server 715 based on the SIP 200 OK received in the process 763.

By the foregoing method, the SMS and/or HTTP, not the SIP message protocol, may be used to transmit the alert message.

FIG. 8 is a diagram illustrating a process of transmitting an alert message using an SIP SUBSCRIBE and NOTIFY method according to an embodiment of the present disclosure.

Referring to FIG. 8, the terminal uses the SIP SUBSCRIBE method to pre-register a specific event situation and based on SIP NOTIFY, the MCPTT server notifies the terminals registered in the event that the event is generated when the corresponding event is generated. The terminal in which the event is generated transmits the alert message to the MCPTT server to notify that the event is generated. A method for transmitting an alert message may use an SIP method or may use protocols (HTTP, SMS, etc.) other than the SIP.

Referring to FIG. 8, the mobile communication system may include a client 1 805, an SIP core 810, an MCPTT server 815, and an MCPTT group management server 820. Further, the mobile communication system may further include an MCPTT client 2 825 and an MCPTT client 3 830.

Processes 841 to 855 show a process of registering a specific event using an SIP subscribe method. In process 841, the MCPTT client 2 825 transmits an SIP subscribe message to an SIP core 825. The MCPTT client 2 825 uses the SIP subscribe message to register a specific event situation. In process 843, the SIP core 810 transmits the SIP subscribe message to the MCPTT server 815. The MCPTT server 815 registers a specific event for the MCPTT client 2 825. In process 845, the MCPTT server 815 transmits the SIP 200 OK to the SIP core 810. In process 847, the SIP core 810 transmits the SIP 200 OK to the MCPTT client 2 825. By the foregoing process, the specific event for the MCPTT client 2 is registered.

In process 849, the MCPTT client 3 830 transmits an SIP subscribe message to the SIP core 810. The MCPTT client 3 830 uses the SIP subscribe message to register a specific event situation. In process 851, the SIP core 810 transmits the SIP subscribe message to the MCPTT server 815. The MCPTT server 815 registers a specific event for the MCPTT client 3 830. In process 853, the MCPTT server 815 transmits the SIP 200 OK to the SIP core 810. In process 855, the SIP core 810 transmits the SIP 200 OK to the MCPTT client 3 830. By the foregoing process, the specific event for the MCPTT client 2 825 is registered.

In process 857, the MCPTT client 1 605 starts the MCPTT alert operation. FIG. 8 illustrates a configuration for transmitting an SIP message by the method for transmitting an alert message, but as described above, the method for transmitting an alert message may use other protocols as well as the SIP message. For example, the HTTP, the SMS, or the like described in FIG. 7 may also be used.

In process 859, the MCPTT client 1 805 transmits the SIP message to an SIP core 810. The SIP message may include the location information of the terminal, the user ID, the group ID, and the affiliated group information. In process 861, the SIP core 810 may transmit the SIP message to the MCPTT server 815.

In process 863, the MCPTT server 815 may check the user authority and/or the user location. The MCPTT server 815 may communicate with the MCPTT group management server 820 to check the user authority and the user location. The MCPTT server 815 may confirm whether the specific event is generated. The MCPTT server may transmit the SIP NOTIFY to a client in which the specific event situation is pre-registered, depending on whether the specific event is generated.

In process 865, the MCPTT server 815 may transmit the SIP NOTIFY to the SIP core 810. The SIP NOTIFY message may indicate the specific event situation. In process 867, the SIP core 810 transmits the SIP NOTIFY to the MCPTT client 2 825.

In process 869, the MCPTT server 815 may transmit the SIP NOTIFY to the SIP core 810. The SIP NOTIFY message may indicate the specific event situation. In process 871, the SIP core 810 transmits the SIP NOTIFY to the MCPTT client 3 830.

In process 873, the MCPTT client 2 825 transmits the SIP 200 OK to the SIP core 810. In process 875, the SIP core 810 transmits the SIP 200 OK to the MCPTT server 815 based on the SIP 200 OK received in the process 877.

In process 879, the MCPTT client 3 830 transmits the SIP 200 OK to the SIP core 810. In process 881, the SIP core 810 transmits the SIP 200 OK to the MCPTT server 815 based on the SIP 200 OK received in the process 883.

In process 883, the MCPTT server 815 transmits the SIP 200 OK to the SIP core 810 based on the received SIP 200 OK. In process 885, the SIP core 810 transmits the SIP 200 OK to the MCPTT client 1 805 based on the SIP 200 OK received from the MCPTT server 815.

The SIP NOTIFY method as the foregoing method may be used to transmit the alert message.

Figure 9:
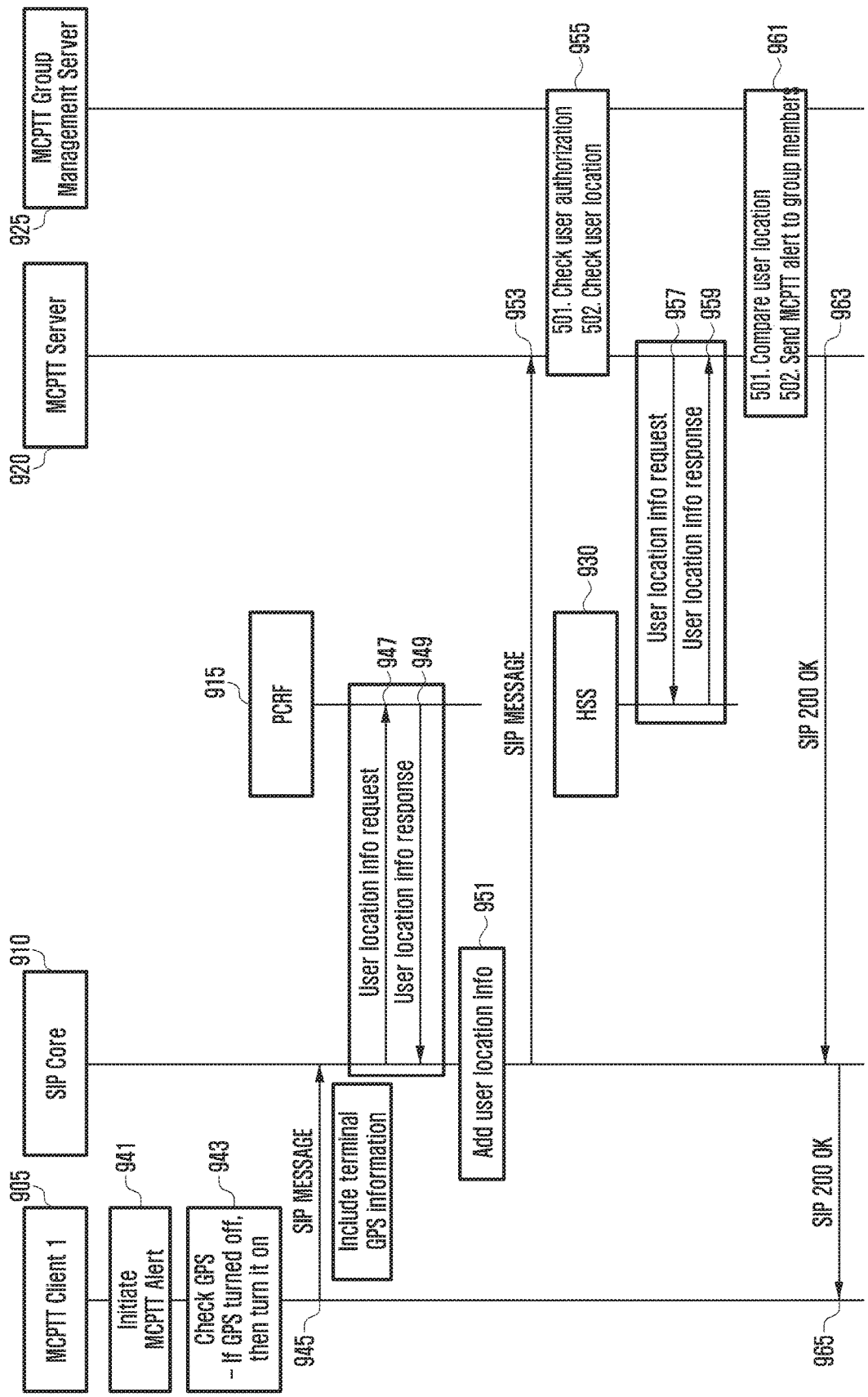
FIG. 9 is a diagram illustrating a process of transmitting an alert message including location information of a terminal according to an embodiment of the present disclosure.

FIG. 9 is a diagram illustrating a process of transmitting an alert message including location information of a terminal according to an embodiment of the present disclosure.

The alert message transmitted by the terminal may include the location information of the terminal. FIG. 9 illustrates a method for acquiring location information and a method for inserting location information into an alert message. The terminal may transmit the alert message including global positioning system (GPS) location system of the terminal. If a GPS function is turned off, the terminal may turn on the GPS. The SIP core receiving the alert message may add the location information of the terminal to the alert message based on the information stored in the SIP core. The MCPTT receiving the alert message may acquire the location information of the terminal from the SIP core or the network to add the corresponding information to the alert message.

Referring to FIG. 9, the mobile communication system may include an MCPTT client 1 905, an SIP core 910, a policy and charging rule function (PCRF) 915, an MCPTT server 920, an MCPTT group management server 925, and a home subscriber server (HSS) 930.

In process 941, the MCPTT client 1 905 starts the MCPTT alert operation.

In process 943, the MCPTT client 1 905 may confirm a state of a location information confirmation device. For example, the location information confirmation device may include the GPS. The MCPTT client 1 905 may change the state of the GPS to a turn on state when the GPS is in a turn off state.

In process 945, the SIP client 1 905 transmits the SIP message to the SIP core 910. The SIP message may include the GPS information of the terminal. In process 947, the SIP core 910 may transmit a user location information request to the PCRF 915. In process 949, the PCRF 915 may transmit user information response information to the SIP core 910. The processes 947 and 949 may be omitted. In process 951, an SIP core 410 may add the user location information received from the SIP client 1 905 and/or the PCRF.

In process 953, the SIP core 405 may transmit the SIP message to the MCPTT server 420. The SIP message may include the user location information. In process 955, the MCPTT server 920 may check the user authority and/or the user location. The MCPTT server 920 may communicate with the MCPTT group management server 925 to check the user authority and the user location. The MCPTT server 920 may confirm the user authority and/or the location information transmitting the alert message to modify, add, and delete the information of the alert message when the alert message needs to be modified.

In process 957, the MCPTT server 920 may transmit the user location information request to the HSS 930. In process 959, the HSS 930 may transmit the user location information response to the MCPTT server 920. The processes 957 and 959 may be omitted.

In process 961, the MCPTT server 920 compares the user location information. At least one of the GPS information, the information acquired from the PCRF, and the information acquired from the HSS may be compared. The MCPTT server 920 may transmit the MCPTT alert message to group members.

In process 963, the MCPTT server 920 transmits the SIP 200 OK to the SIP core 910. In process 965, the SIP core 910 transmits the SIP 200 OK to the MCPTT client 1 905.

By the foregoing method, the alert message including the location information of the terminal may be transmitted.

In FIGS. 10 to 14, the MCPTT terminal or the MCPTT server may provide the MCPTT priority service. In FIGS. 10 to 14, when the MCPTT terminal or the MCPTT server receives the service request, the operation of the terminal or the server described with reference to FIGS. 1 to 5 may be performed.

Figure 10:
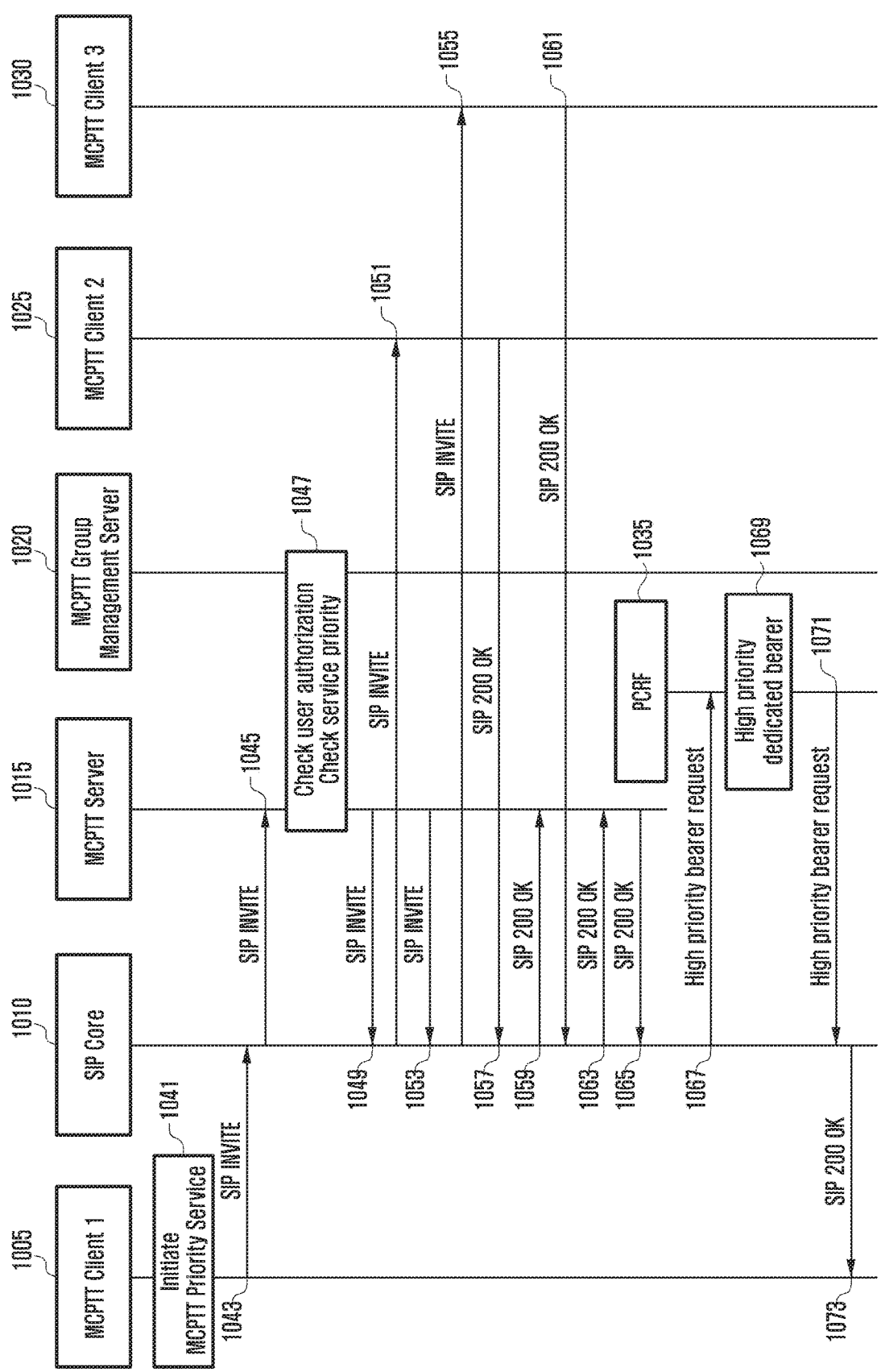
FIG. 10 is a diagram illustrating a process of setting a group call according to an embodiment of the present disclosure.

FIG. 10 is a diagram illustrating a process of setting a group call according to an embodiment of the present disclosure.

The MCPTT terminal may start the emergency group call through the MCPTT network. The server receiving the group call request from the terminal confirms whether the corresponding user may perform the group call request. Further, the SIP core receiving the group call request allocates resources meeting the group call.

Referring to FIG. 10, in process 1041, an MCPTT client 1 1005 starts the MCPTT priority service. In process 1043, the MCPTT client 1 1005 transmits an SIP INVITE to the SIP core 1010. In process 1045, the SIP core 1010 may transmit the SIP INVITE to the MCPTT server 1015.

In process 1047, the MCPTT server 1015 checks the user authority. Further, the MCPTT server 1015 checks the service priority. The MCPTT server 1015 may communicate with the MCPTT group management server 1020 to check the user authority and the service priority. In process 1049, the MCPTT server 1015 may transmit the SIP INVITE to the SIP core 1010 based on the check result. In process 1051, the SIP core 1010 may transmit the SIP INVITE to the MCPTT client 2 1025.

In process 1053, the MCPTT server 1015 may transmit the SIP INVITE to the SIP core 1010 based on the check result. In process 1055, the SIP core 1010 may transmit the SIP INVITE to the MCPTT client 3 1030.

In process 1057, the MCPTT client 2 1025 transmits an SIP 200 OK to the SIP core 1010. In process 1059, the SIP core 1010 may transmit the SIP 200 OK to the MCPTT server 1015. In process 1061, the MCPTT client 3 1030 transmits an SIP 200 OK to the SIP core 1010. In process 1063, the SIP core 1010 may transmit the SIP 200 OK to the MCPTT server 1015.

In process 1065, the MCPTT server 1015 may transmit the SIP 200 OK to the SIP core 1010. In process 1067, the SIP core 1010 may transmit a bearer request (e.g., high priority) message to the PCRF 1035. The SIP core 1010 may request a bearer having high priority. In process 1069, the PCRF 1035 may allocate a bearer. The bearer may be a bearer having high priority and may be a dedicated bearer. In process 1071, the PCRF 1035 may transmit a bearer response message to the SIP core 1010. In process 1073, the SIP core 1010 may transmit the SIP 200 OK to the MCPTT client 1 1005.

By the foregoing method, the emergency group call may be set.

Figure 11:
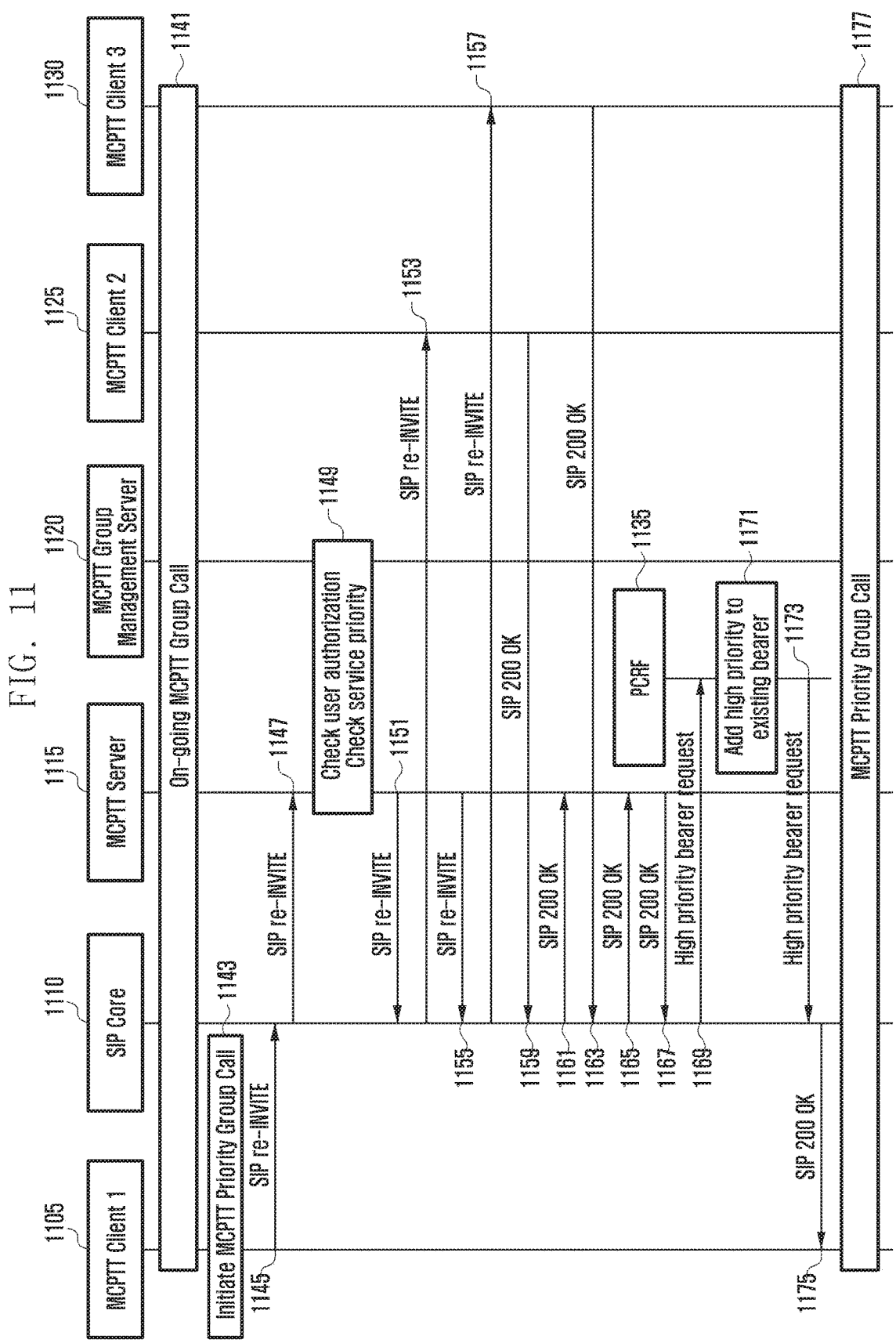
FIG. 11 is a diagram illustrating a process of changing a general group call to an emergency group call according to an embodiment of the present disclosure.

FIG. 11 is a diagram illustrating a process of changing a general group call to an emergency group call according to an embodiment of the present disclosure.

The terminal may change the corresponding group call among the current group calls to the emergency group call. The server confirms whether the user has authority to perform the corresponding request. The SIP core changes a resource to meet the emergency group call.

Referring to FIG. 11, the mobile communication system may include a client 1 1105, an SIP core 1110, an MCPTT server 1115, and an MCPTT group management server 1120. Further, the mobile communication system may further include an MCPTT client 2 1125, an MCPTT client 3 1130, and a PCRF 1135.

In process 1141, the MCPTT client 1 1105 is performing the group call. The MCPTT client 1 1105 is performing the group call with the MCPTT client 2 1125 and the MCPTT client 3 1130.

In process 1143, the MCPTT client 1 1105 starts the MCPTT priority service. It is assumed that the priority service is an MCPTT priority group call service. In process 1145, the MCPTT client 1 1105 transmits an SIP re-INVITE to the SIP core 1110. In process 1147, the SIP core 1110 may transmit the SIP re-INVITE to the MCPTT server 1115.

In process 1149, the MCPTT server 1115 checks the user authority. Further, the MCPTT server 1115 checks the service priority. The MCPTT server 1115 may communicate with the MCPTT group management server 1120 to check the user authority and the service priority. In process 1151, the MCPTT server 1115 may transmit the SIP re-INVITE to the SIP core 1110 based on the check result. In process 1153, the SIP core 1110 may transmit the SIP re-INVITE to the MCPTT client 2 1125. In process 1155, the MCPTT server 1115 may transmit the SIP re-INVITE to the SIP core 1110 based on the check result. In process 1157, the SIP core 1110 may transmit the SIP re-INVITE to the MCPTT client 2 1125.

In process 1159, the MCPTT client 2 1125 transmits the SIP 200 OK to the SIP core 1110. In process 1161, the SIP core 1110 transmits the SIP 200 OK to the MCPTT server 1115. In process 1163, the MCPTT client 3 1130 transmits the SIP 200 OK to the SIP core 1110. In process 1165, the SIP core 1110 transmits the SIP 200 OK to the MCPTT server 1115. In process 1167, the MCPTT server 1115 transmits the SIP 200 OK to the SIP core 1110.

In process 1169, the SIP core 1110 may transmit a bearer request (e.g., high priority) message to the PCRF 1135. The SIP core 1110 may request the bearer having high priority for the emergency call. In process 1171, the PCRF 1135 may allocate a bearer. The bearer may be a bearer having high priority and may be a dedicated bearer. In process 1173, the PCRF 1135 may transmit the bearer response message to the SIP core 1110. In process 1175, the SIP core 1110 may transmit the SIP 200 OK to the MCPTT client 1 1105. Next, in process 1177, the entities which are performing the general group call are changed to the emergency group call. The respective entities may perform the MCPTT priority group call.

By the foregoing method, the general group call may be changed to the emergency group call.

Figure 12:
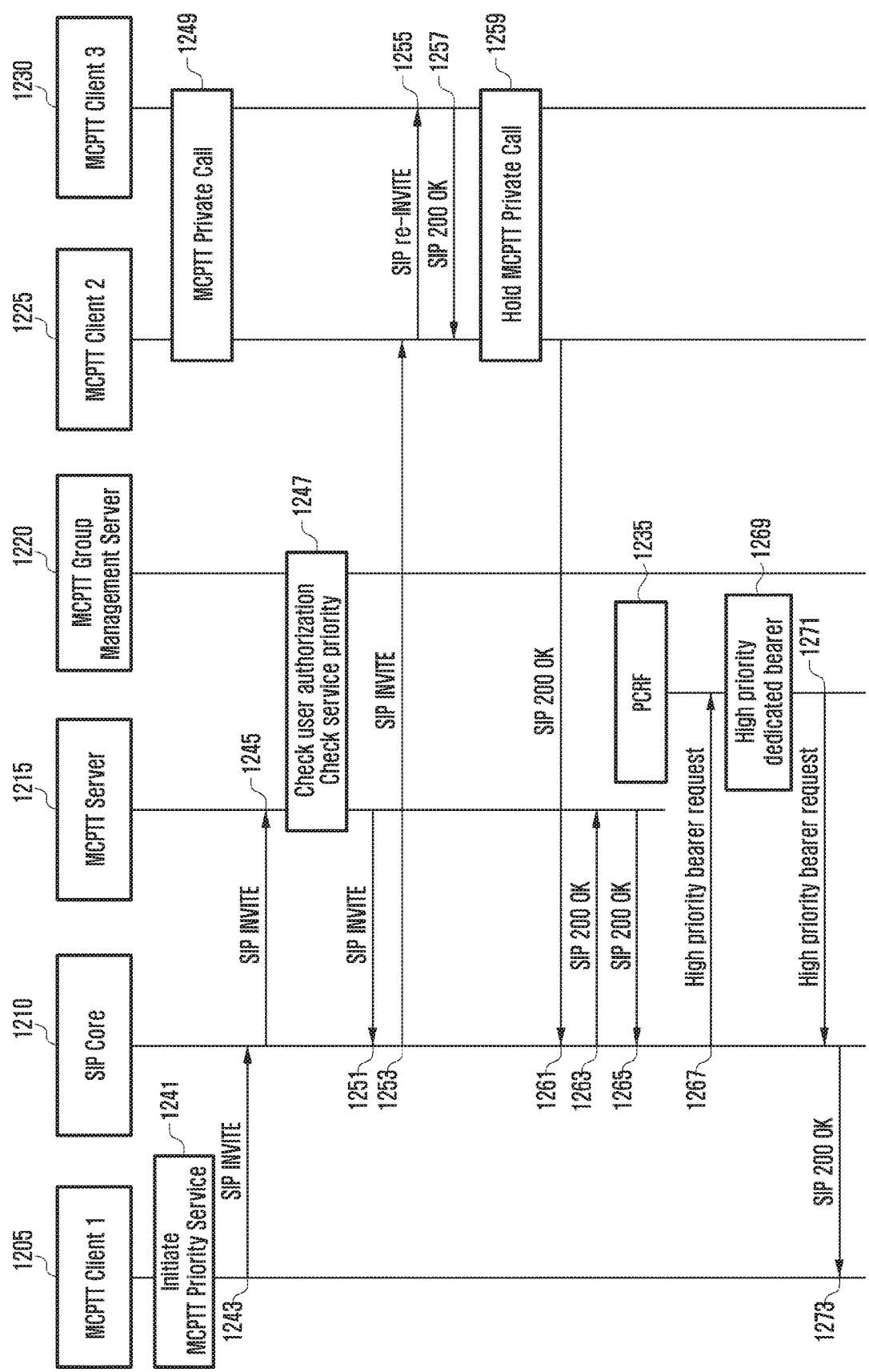
FIG. 12 is a diagram illustrating a process of processing, by a terminal, an emergency group call request among other services according to an embodiment of the present disclosure.

FIG. 12 is a diagram illustrating a process of processing, by a terminal, an emergency group call request among other services according to an embodiment of the present disclosure.

The terminal receiving the emergency group call request may disregard the corresponding request and continue the existing service, stop the existing service and start the emergency group call, or modify media of at least one of the current service and the emergency group call service.

Referring to FIG. 12, the mobile communication system may include a client 1 1205, an SIP core 1210, an MCPTT server 1215, and an MCPTT group management server 1220. Further, the mobile communication system may further include an MCPTT client 2 1225, an MCPTT client 3 1230, and a PCRF 1235.

In process 1241, the MCPTT client 1 1205 starts the MCPTT priority service. In process 1243, the MCPTT client 1 1205 transmits an SIP INVITE to the SIP core 1210. In process 1245, the SIP core 1210 may transmit the SIP INVITE to the MCPTT server 1215.

In process 1247, the MCPTT server 1215 checks the user authority. Further, the MCPTT server 1215 checks the service priority. The MCPTT server 1215 may communicate with the MCPTT group management server 1220 to check the user authority and the service priority. In process 1251, the MCPTT server 1215 may transmit the SIP INVITE to the SIP core 1210 based on the check result.

In process 1253, the SIP core 1210 may transmit the SIP INVITE to the MCPTT client 2 1225. Meanwhile, in process 1249, the MCPTT client 2 1225 and the MCPTT client 3 1230 is performing a private call. The MCPTT client 2 1225 receiving the SIP INVITE from the SIP core 1210 transmits the SIP re-INVITE to the MCPTT client 3 1230 in process 1255. In process 1257, the MCPTT client 3 1230 transmits the SIP 200 OK to the MCPTT client 2 1225. In process 1259, the private call of the MCPTT client 2 1225 and the MCPTT client 3 1230 becomes a hold state.

In process 1261, the MCPTT client 2 1225 transmits the SIP 200 OK to the SIP core 1210. In process 1263, the SIP core 1210 transmits the SIP 200 OK to the MCPTT server 1215. In process 1265, the MCPTT server 1215 transmits the SIP 200 OK to the SIP core 1210.

In process 1267, the SIP core 1210 may transmit the bearer request message to the PCRF 1235. The SIP core 1210 may request the bearer having high priority for the emergency call. In process 1269, the PCRF 1235 may allocate a bearer. The bearer may be a bearer having high priority and may be a dedicated bearer. In process 1271, the PCRF 1235 may transmit the bearer response message to the SIP core 1210. In process 1273, the SIP core 1210 may transmit the SIP 200 OK to the MCPTT client 1 1205.

By the foregoing method, another service main emergency group call may be requested.

The terminal may transmit the alert message to the corresponding group member prior to requesting the emergency group call service. That is, by one of the methods described with reference to FIGS. 6 to 9, the alert message is transmitted and by one of the methods described with reference to FIGS. 10 to 12, the emergency group call service is requested.

Figure 13:
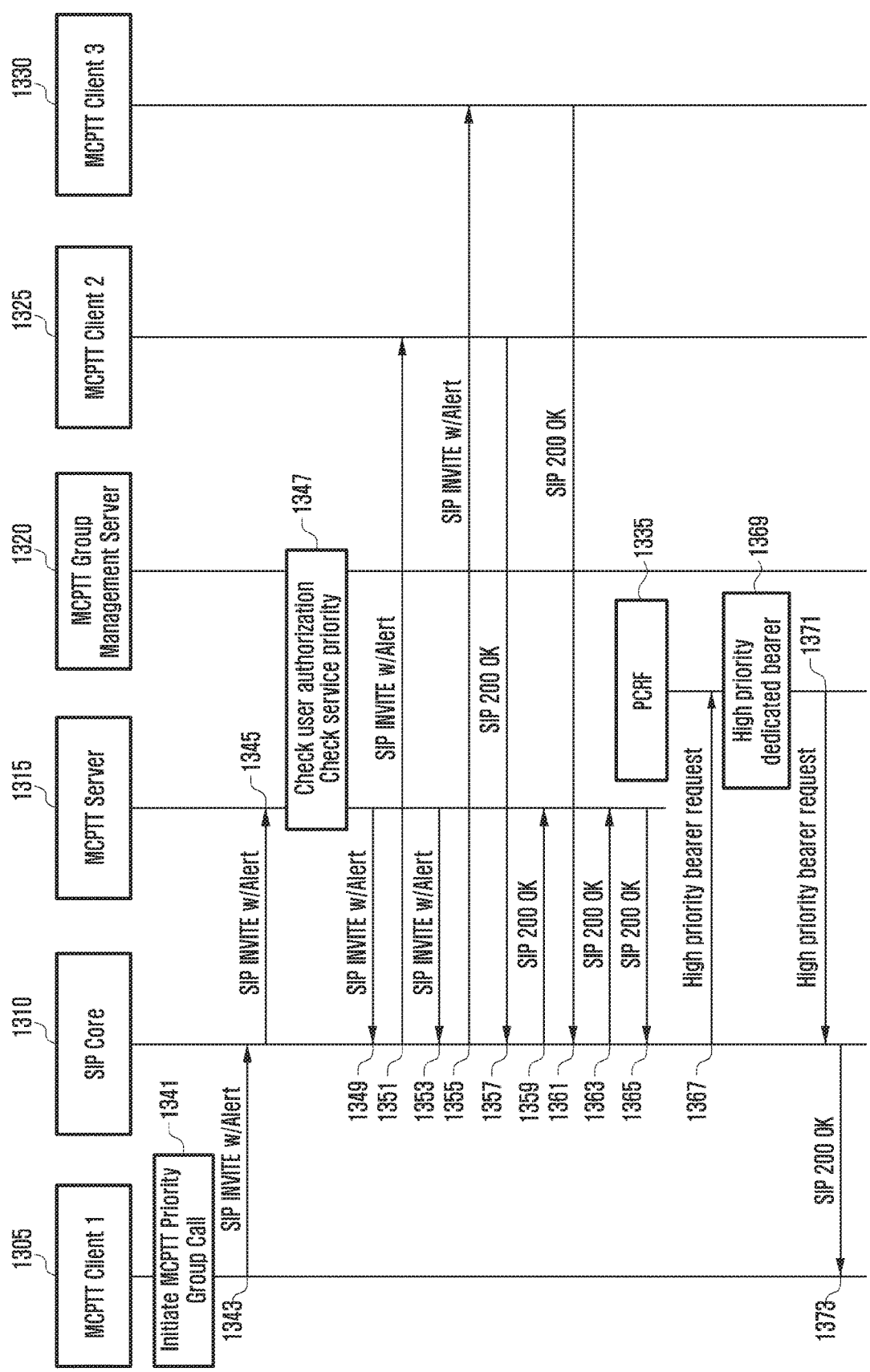
FIG. 13 is a diagram illustrating a process of transmitting an alert message included in an emergency group call request message according to an embodiment of the present disclosure.

FIG. 13 is a diagram illustrating a process of transmitting an alert message included in an emergency group call request message according to an embodiment of the present disclosure.

Referring to FIG. 13, the mobile communication system may include an MCPTT client 1 1305, an SIP core 1310, an MCPTT server 1315, and an MCPTT group management server 1320. Further, the mobile communication system may further include an MCPTT client 2 1325 and an MCPTT client 3 1330.

In process 1341, the MCPTT client 1 1305 starts the MCPTT priority group call operation. In process 1343, the MCPTT client 1 1305 transmits the SIP INVITE message to the SIP core 1310. According to the present embodiment, the MCPTT client 1 1305 may transmit the SIP INVITE message including the alert message. The SIP INVITE message including the alert message is transcribed as an SIP INVITE w/ Alert.

In process 1345, the SIP core 1310 may transmit the SIP INVITE w/Alert to the MCPTT client 1 in process or operation 1315. In process 1347, the MCPTT server 1315 checks the user authority. Further, the MCPTT server 1315 checks the service priority. The MCPTT server 1315 may communicate with the MCPTT group management server 1320 to check the user authority and the service priority. In process 1349, the MCPTT server 1315 may transmit the SIP INVITE w/Alert to the SIP core 1310 based on the check result.

In process 1351, the SIP core 1310 may transmit the SIP INVITE w/Alert to the MCPTT client 2 1325. In process 1353, the MCPTT server 1315 may transmit the SIP INVITE to the SIP core 1310 based on the check result. In process 1355, the SIP core 1310 may transmit the SIP INVITE w/Alert to the MCPTT client 3 1330.

In process 1357, the MCPTT client 2 1325 transmits an SIP 200 OK to the SIP core 1310. In process 1359, the SIP core 1310 may transmit the SIP 200 OK to the MCPTT server 1315. In process 1361, the MCPTT client 3 1330 transmits an SIP 200 OK to the SIP core 1310. In process 1363, the SIP core 1310 may transmit the SIP 200 OK to the MCPTT server 1315.

In process 1365, the MCPTT server 1315 may transmit the SIP 200 OK to the SIP core 1310. In process 1367, the SIP core 1310 may transmit the bearer request message to the PCRF 1335. The SIP core 1310 may request a bearer having high priority. In process 1369, the PCRF 1335 may allocate a bearer. The bearer may be a bearer having high priority and may be a dedicated bearer. In process 1371, the PCRF 1335 may transmit the bearer response message to the SIP core 1310. In process 1373, the SIP core 1310 may transmit the SIP 200 OK to the MCPTT client 1 1305.

Figure 14:
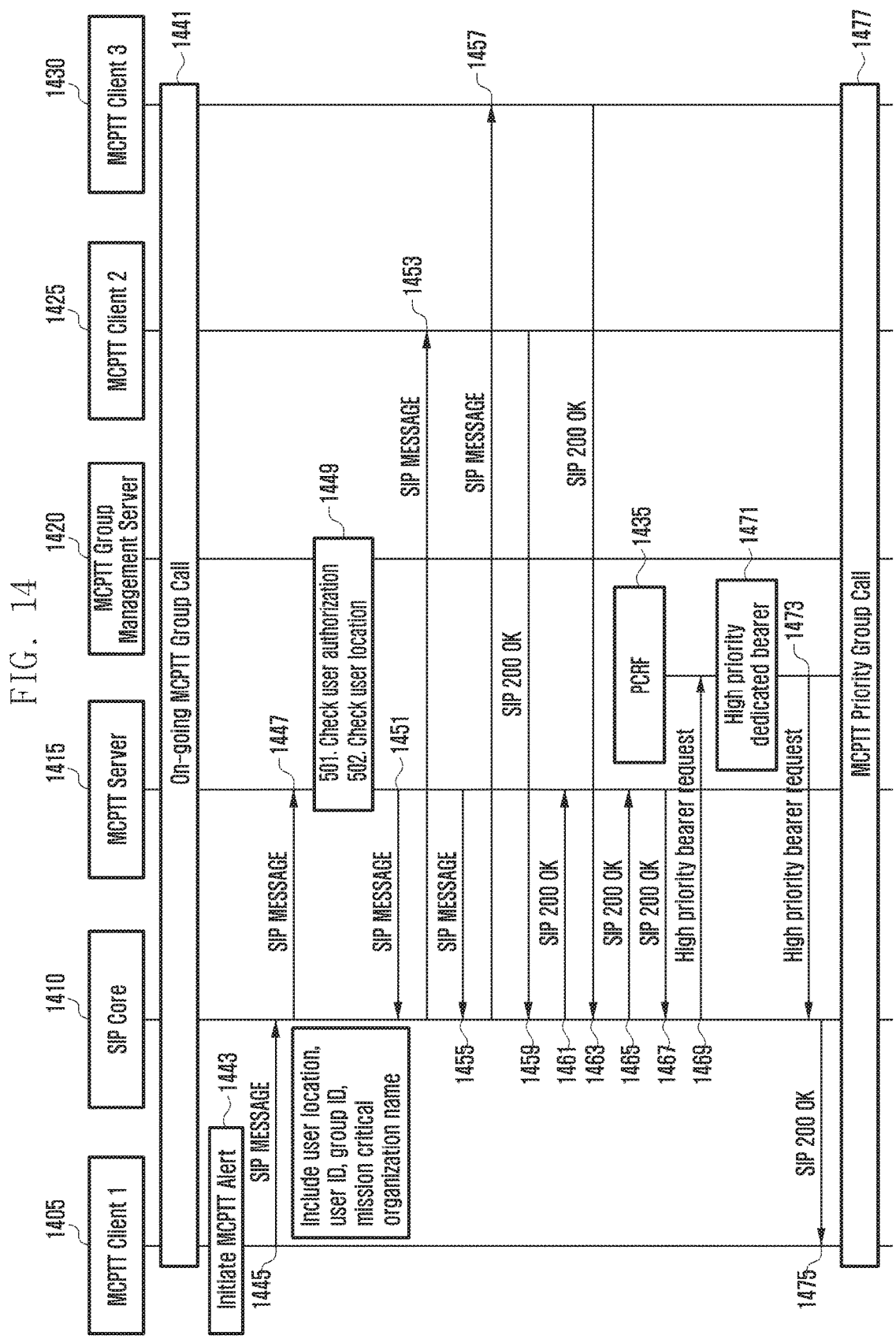
FIG. 14 is a diagram illustrating a process of receiving an alert message among general group calls and changing the general group call to an emergency group call according to an embodiment of the present disclosure.

FIG. 14 is a diagram illustrating a process of receiving an alert message among general group calls and changing the general group call to an emergency group call according to an embodiment of the present disclosure.

The alert message may include protocols (HTTP, SMS, etc.) other than an SIP method (SIP MESSAGE, SUBSCRIBE/NOTIFY, etc.) and SIP. The SIP core receiving the corresponding alert message modifies the resource allocated to the general group call to meet the emergency group call.

Referring to FIG. 14, the mobile communication system may include an MCPTT client 1 1405, an SIP core 1410, an MCPTT server 1415, and an MCPTT group management server 1420. Further, the mobile communication system may further include an MCPTT client 2 1425 and an MCPTT client 3 1430.

In process 1441, the entity of the communication system is performing the general group call.

In process 1443, the MCPTT client 1 1405 starts the MCPTT alert operation. In process 1445, the MCPTT client 1 1405 transmits the SIP message to an SIP core 1410. The SIP message may include the location information of the terminal, the user ID, the group ID, and the affiliated group information. In process 1447, the SIP core 1410 may transmit the SIP message to the MCPTT server 1415.

In process 1449, the MCPTT server 1415 may check the user authority and/or the user location. The MCPTT server 1415 may communicate with the MCPTT group management server 1420 to check the user authority and the user location. The MCPTT server 1415 may confirm the user authority and/or the location information transmitting the alert message to modify, add, and delete the information of the alert message when the alert message needs to be modified.

In process 1451, the MCPTT server 1415 transmits the SIP message to the SIP core 1410. The SIP message may be a message in which some of its information may be modified, added, and deleted in the MCPTT server 1415. In process 1453, the SIP core 1410 transmits the SIP message to the MCPTT client 2 1425 based on the SIP message received in the process 1451. In process 1455, the MCPTT server 1415 transmits the SIP message to the SIP core 1410. The SIP message may be a message in which some of its information may be modified, added, and deleted in the MCPTT server 1415. In process 1457, the SIP core 1410 transmits the SIP message to the MCPTT client 2 1425 based on the SIP message received in the process 1455.

In process 1459, the MCPTT client 2 1425 transmits the SIP 200 OK to the SIP core 1410. In process 1461, the SIP core 1410 transmits the SIP 200 OK to the MCPTT server 1415 based on the SIP 200 OK received in the process 1459.

In process 1463, the MCPTT client 3 1430 transmits the SIP 200 OK to the SIP core 1410. In process 1465, the SIP core 1410 transmits the SIP 200 OK to the MCPTT server 1415 based on the SIP 200 OK received in the process 1463.

In process 1467, the MCPTT server 1415 transmits the SIP 200 OK to the SIP core 1410 based on the received SIP 200 OK. In process 1469, the SIP core 1410 may transmit the bearer request message to the PCRF 1435. The SIP core 1410 may request a bearer having high priority. In process 1471, the PCRF 1435 may allocate a bearer. The bearer may be a bearer having high priority and may be a dedicated bearer. In process 1473, the PCRF 1435 may transmit the bearer response message to the SIP core 1410.

In process 1475, the SIP core 1410 may transmit the SIP 200 OK to the MCPTT client 1 1405. Next, in process 1477, the entities which are performing the general group call are changed to the emergency group call. The respective entities may perform the MCPTT priority group call.

By the foregoing method, the terminals which are performing the general group call may receive the alert message and then may be changed to the emergency call.

Figure 15:
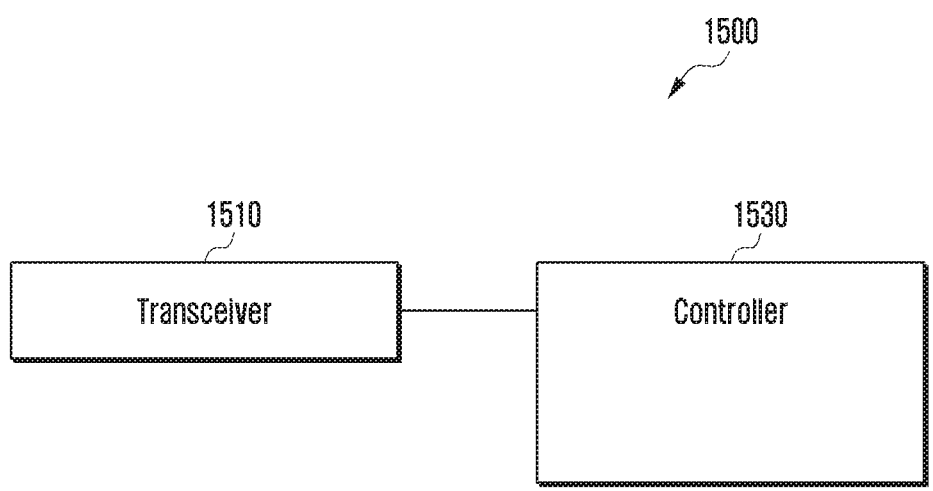
FIG. 15 is a diagram illustrating a terminal according to an embodiment of the present disclosure.

FIG. 15 is a diagram illustrating a terminal according to an embodiment of the present disclosure.

Referring to FIG. 15, a terminal 1500 according to the present disclosure may include a transceiver 1510 and a processor or controller 1530. The transceiver 1510 may include a receiver and a transmitter. The transceiver may transmit and receive a signal to and from another network entity. The signal may include at least one of control information, data, and a pilot. The processor or controller 1530 may control a general operation of the terminal.

The transceiver 1510 may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the processor or controller 1530 and transmit the signal output from the processor or controller 1530 through the radio channel.

For example, the processor or controller 1530 may perform a control to receive a first service request from the MCPTT server, determine whether a first service corresponding to the first service request and a second service being currently performed are simultaneously provided, and at the same time, if it is determined that the first service and the second service are not simultaneously provided, process the respective services based on priority associated with the respective services.

Further, the processor or controller 1530 may perform a control to process the respective services by adjusting media for a posterior service among the respective services. In this case, the adjustment may include at least one of operations of ending and rejecting the posterior service, holding until the prior order service ends, converting into a service which may be simultaneously provided with the media of the prior order service, and forwarding to the preset other terminals. Further, the priority may include at least one of priorities for each user, priorities for each group, and priorities for each service.

Meanwhile, the operation and the function of the terminal 1500 and the processor or controller 1530 are not limited to the content described in FIG. 15. The controller 1530 may control a series process to operate the terminal 1500 according to the embodiment of the present disclosure.

Figure 16:
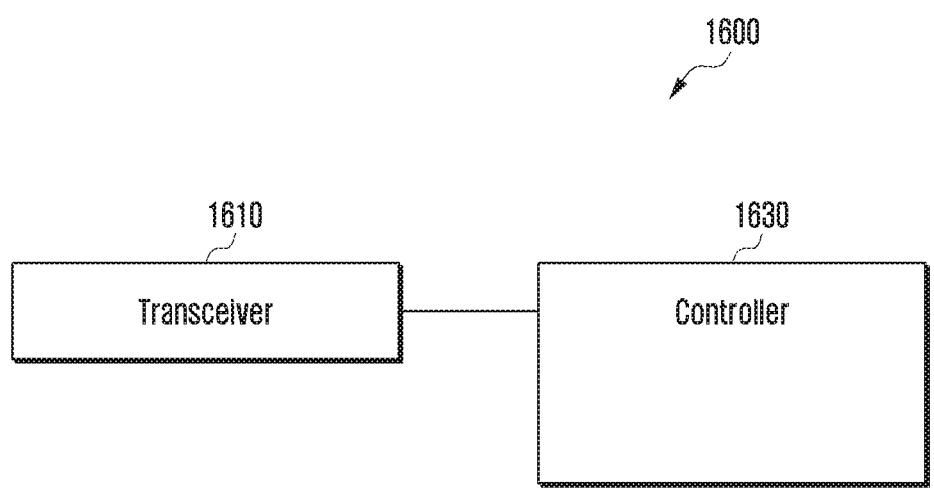
FIG. 16 is a diagram illustrating a mission critical push to talk (MCPTT) server according to an embodiment of the present disclosure.

FIG. 16 is a block diagram illustrating a structure of an MCPTT server according to an embodiment of the present disclosure.

Referring to FIG. 16, an MCPTT server 1600 according to the embodiment of the present disclosure may include a transceiver 1610 and a processor or controller 1630. The transceiver may include a receiver and a transmitter. The transceiver 1610 may transmit and receive a signal to and from another network entity. The processor or controller 1630 may control a general operation of the MCPTT server 1600.

According to the embodiment of the present disclosure, the processor or controller 1630 may perform a control to receive a first service request from a first terminal to a second terminal, determine whether a first service corresponding to the first service request and a second service which is currently being performed by the second terminal may be simultaneously provided from the second terminal, and at the same time, if it is determined that the first service and the second service are not simultaneously provided, determine the processing of the respective services based on the priority related to the respective service, and transmit the service request message to the second terminal based on the determination.

Further, the processor or controller 1630 may perform a control to adjust media for a posterior service among the respective services. In this case, the adjustment may include at least one of operations of ending and rejecting the posterior service, holding until the prior order service ends, converting into a service which may be simultaneously provided with the media of the prior order service, and forwarding to the preset other terminals. Further, the priority may include at least one of priorities for each user, priorities for each group, and priorities for each service.

Further, the processor or controller 1630 may perform a control to receive a floor request message from the first terminal, receive the floor request message from the second terminal, and transmit a floor grant message to a prior order terminal based on the priority of the first terminal and the second terminal.

Further, when the service request is the group service request, the processor or controller 1630 may perform a control to determine whether the number of group service target terminals for the group service meets the present threshold condition and determine whether the group service is provided by the multicast or unicast method based on the threshold condition determination result.

Meanwhile, the operation and the function of the MCPTT server 1600 and the processor or controller 1630 are not limited to the content described in FIG. 16. The processor or controller 1630 may control a series process to operate the MCPTT server 1600 according to the embodiment of the present disclosure described above.

Meanwhile, in FIGS. 6 to 14, the respective entities include the processor or controller for controlling the respective entities and the transceiver for allowing the respective entities to transmit and receive a signal to and from other network entities.

In accordance with the embodiments of the present disclosure, it is possible to provide the method and apparatus for providing a priority service in the wireless communication system.

In accordance with the embodiments of the present disclosure, it is possible to provide and process the service based on the priority and provide the service having the guaranteed QoS by providing the priority service.

Further, in accordance with the embodiments of the present disclosure, it is possible to provide the method and apparatus for transmitting a message to allow a terminal to notify other terminals of an emergency situation when the emergency situation happens and setting a call. Further, it is possible to assist the relief for the emergency situation by transmitting the media collected by the terminal to the manager when the emergency situation happens.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a wireless communication system, the method comprising:
   receiving a first service request related to mission critical push to talk (MCPTT);
   determining whether a first service corresponding to the first service request and a second service, being currently performed, are simultaneously provided; determining a priority of the first service and a priority of the second service, when the first service and the second service are not simultaneously provided;
   changing a media type of the second service to a media type by which a media type of the first service is provided simultaneously, when the priority of the first service is higher than the priority of the second service; and
   providing the first service and the second service simultaneously by using the changed media type of the second service.

2. The method of claim 1, wherein the changing the media type of the second service includes at least one of:
   ending or rejecting the second service,
   holding the second service until the first service ends, or
   forwarding the second service to one or more other terminals.

3. The method of claim 1, wherein the priority of each of the services includes at least one of a priority of a user, a priority of a group, or a priority of a service.

4. A terminal in a wireless communication system, the terminal comprising:
  a transceiver configured to transmit and receive a signal; and
  a processor configured to:
    receive a first service request related to mission critical push to talk (MCPTT),
    determine whether a first service corresponding to the first service request and a second service, being currently performed, are simultaneously provided,
    determine a priority of the first service and a priority of the second service, when the first service and the second service are not simultaneously provided,
    change a media type of the second service to a media type by which a media type of the first service is provided simultaneously, when the priority of the first service is higher than the priority of the second service, and
    provide the first service and the second service simultaneously by using the changed media type of the second service.

5. The terminal of claim 4, wherein the processor is further configured to perform at least one of following operations:
  ending or rejecting the second service,
  holding the second service until the first service ends, or
  forwarding the second service to one or more other terminals.

6. The terminal of claim 4, wherein the priority includes at least one of a priority of a user, a priority of a group, or a priority of a service.

\* \* \* \* \*